United States Patent [19]
Washburn et al.

[11] Patent Number: 5,157,779
[45] Date of Patent: Oct. 20, 1992

[54] USER EXTENSIBLE TESTING SYSTEM

[75] Inventors: James C. Washburn, HaverHill; Steven E. Lemmo, Natick, both of Mass.

[73] Assignee: Sun Microsystems, Inc., Mountain View, Calif.

[21] Appl. No.: 534,431

[22] Filed: Jun. 7, 1990

[51] Int. Cl.$^5$ .............................................. G06F 11/00
[52] U.S. Cl. .................. 395/575; 364/266.4; 364/267.91; 364/285.4; 364/DIG. 1; 371/19; 371/25.1
[58] Field of Search .................. 371/19, 25.1; 395/575; 364/266.4, 267.91, 285.4, 286.3

[56] References Cited

U.S. PATENT DOCUMENTS

| | | | |
|---|---|---|---|
| 4,819,233 | 4/1989 | Delucia et al. | 371/19 |
| 4,872,167 | 10/1989 | Maezawa et al. | 371/19 |
| 5,022,028 | 6/1991 | Edmonds et al. | 371/25.1 |
| 5,063,535 | 11/1991 | Jacobs et al. | 395/575 |

Primary Examiner—Charles E. Atkinson
Attorney, Agent, or Firm—Blakely Sokoloff Taylor & Zafman

[57] ABSTRACT

A user extensible, automated testing system comprises a plurality of modules, each of which is user extensible. The journal module provides the ability to record events representative of user actions taken to execute certain tasks which farm the test. The filter module provides the means to filter out data which is not determinative of the pass or fail status of a test. The save data module provides the means to save data which subsequently compared to master data to determine the pass/fail status of the test. The compare module provides the means to compare the data saved with the master data to determine differences between the data and therefore the pass/fail status of the test. The review module provides a graphical review of the differences between the master data and actual data. Each module is user extensible whereby the user may update, change or delete portions of the module functionality in order to tailor the testing system to a particular computer system or computer software application.

78 Claims, 61 Drawing Sheets

```
static char  sccsid[]="@(#)ARTfloat.1  1.1   11/20/89 ";
/*------------------------------------------------
/ ARTfloat.1
/------------------------------------------------*/
/*------------------------------------------------
/ FLOAT    +12.34e-04,    -.1e2,    -2.,    3E5 etc...
/------------------------------------------------*/
D       [0-9]
E       ([DEde] [- +]? [0-9] [0-9]?)
FLOAT   ((([+ -] ?{D} +\ .{D}*{E}?) | ([+-]?{D}*\.{D}+{E}? | ({D} {E}))
/*------------------------------------------------
/ Working variables.
/*------------------------------------------------*/
static     char     mask [] = {"################"};
static     char
*floatfmt [] = { " %1.4e "," %.5f "," %1.4f "," %2.3f ",
                 " %3.2f "," %4.1f "," %5.0f "," %1.4e "};
   float        number , absnum;
/*------------------------------------------------
/ re-format floats
/*------------------------------------------------*/
% %
^{FLOAT} ([\n]?)  |
[ ] {FLOAT} ([\n]?)        {
           sscanf(yytext, "%g",&number):
           if((absnum=number)<0.0000000) absnum *= -1.000000;
           if(absnum<0.1)          {prlntf(floatfmt [0],number);}
           else lf(absnum<1.0)     {prlntf(floatfmt [1],number);}
           else lf(absnum<10.0)    {prlntf(floatfmt [2],number);}
           else lf(absnum<100.0)   {prlntf(floatfmt [3],number);}
           else lf(absnum<1000.0)  {prlntf(floatfmt [4],number);}
           else lf(absnum<10000.0) {prlntf(floatfmt [5],number);}
           else lf(absnum<100000.0) {prlntf(floatfmt [6],number);}
           else                    {prlntf(floatfmt [7],number);}
              if(yytext[strlen(yytext)-1] =='\n')
      print("\n");
              else
}
```

Figure 3a

```
static char sccsid[]="@(#)ARTspace.c 1.1   11/20/89 ";
#include <stdio.h>
main()
{
register char c,lastc='x';
while((c=getchar())!=EOF)
    if(c==' ' || c=='\t')
        if(lastc==' ') ;
        else   putchar(lastc=' ') ;
    else   putchar(lastc=c) ;
}
```

Figure 3b

| norm. resid | resld | machep | x(1)-1 | x(n)-1 |
|---|---|---|---|---|
| 1.9 | 4.52336171E-05 | 1.19209290E-07 | -1.31130219E-05 | -1.30539172E-05 | times are reported for matrices of order 100
times for array with leading dimension of 201

| sgefa | sgesl | total | Kflops | unit | ratio |
|---|---|---|---|---|---|
| 3.24 | 0.08 | 3.32 | 207. | 9.67 | 59.29 |
| 3.30 | 0.00 | 3.30 | 208. | 9.61 | 58.93 |
| 3.30 | 0.00 | 3.30 | 208. | 9.61 | 58.93 |
| 3.50 | 0.00 | 3.50 | 196. | 10.19 | 62.46 | times for array with leading dimension of 200

| 3.34 | 0.10 | 3.44 | 200. | 10.02 | 61.43 |
| 3.36 | 0.00 | 3.36 | 204. | 9.79 | 60.00 |
| 3.32 | 0.00 | 3.32 | 207. | 9.67 | 59.29 |
| 3.36 | 0.00 | 3.36 | 204. | 9.78 | 59.96 |

ROLLED SINGLE PRECISION LINPACK PERFORMANCE 196 KFLOPS

Figure 5a

```
norm. resid resid machep  x(1)-1  x(n)-1
1.9000  4.5234e-05  1.1921e-07  -1.3113e-05  -1.3053e-05 times are reported for matrices of order 100
sgefa sgesl total KIflops unit ratio
times for array with leading dimension of 201
3.2400  8.0000e-02  3.3200  207.00  9.6700  59.290
3.3000  0.0000e+00  3.3000  208.00  9.6100  58.930
3.3000  0.0000e+00  3.3000  208.00  9.6100  58.930
3.5000  0.0000e+00  3.5000  196.00  10.190  62.460 times for array with leading dimension of 200
3.3400  0.10000     3.4400  200.00  10.020  61.430
3.3600  0.0000e+00  3.3600  204.00  9.7900  60.000
3.3200  0.0000e+00  3.3200  207.00  9.6700  59.290
3.3600  0.0000e+00  3.3600  204.00  9.7800  59.960

ROLLED SINGLE PRECISION LINPACK PERFORMANCE  196 KFLOPS
```

Figure 5b save module:
/* routine gets name of file to save into as arg1, name of file to save
 * as arg2
 */ include <stdio.h>

```
int
main ( argc, argv)

int    argc;
char *argv[ ];
{
        FILE      *InFile, *OutFile;
        int    Character;

if ( argc != 3 ) {
                fprintf ( stderr, "invalid number of args!\n" );
                exit ( -1 );
        }
        if ( NULL == ( OutFile = fopen ( argv[1], "w" ))) {
                fprintf ( stderr, "unable to open output file %s\n", argv[1]
                exit( -1 );
        }
        if ( NULL == ( InFile = fopen (argc[2], "r" ))) {
                fclose ( OutFile );
                fprintf ( stderr, "unable to open input file %s\n", argv[2] );
        } while ( EOF != ( Character = getc( InFile )))
                putc ( (char) Character, OutFile );

fclose( InFile );
        fclose ( OutFile );

exit ( 0 );
}
```

Figure 6a

```
compare module:
#include <stdio.h>
/* routine is passed two args of files to compare. If the files are
 * identical, the actual file is removed (this is how the compare
 * routine communicates with IRS). Otherwise, the file is left intact.
/*
int
main ( argc, argv )
int        argc;
char       *argv[ ];
{
        FILE     *MasterFile, *ActualFile;
        char MasterChar, ActualChar;
        int  Status = 1;  /* if set to 0, comparison failed */
        if ( argc != 3 ) {
                fprintf( stderr, "invalid number of args!\n" );
                exit( -1 );
        }
        if ( NULL == ( MasterFile = fopen( argv[1], "r" ))) {
                fprintf( stderr, "unable to open master file %s\n", argv[1]
                exit ( -1 );
        }
        if ( NULL == ( ActualFile = fopen( argv[2], "r" ))) {
                fclose ( MasterFile );
                fprintf( stderr, "unable to open actual file %s\n", argv[2]
                exit( -1 );
        }
        /* read through both files until we either reach the end of one o
         * both files, or until we find a character that is not the same
         */
        while(( EOF != ( MasterChar = getc ( MasterFile )) & &
            ( EOF != ( ActualChar = getc( ActualFile )))) {
                if ( MasterChar != ActualChar ) {
                        Status = 0;  /* something is different - we're done */
                        break;
                }
        }
        if (( EOF != ( MasterChar = getc( MasterFile ))) | |
            ( EOF != ( ActualChar = getc( ActualFile )))) {
                Status = 0;  /* files are not the same length */
        }
        fclose ( MasterFile );
        fclose ( ActualFile );
        if( Status =- 1 )
                unlink ( argv[2] );
        exit( 0 );
}
```

Figure 7a review module:
```
/* we use diff to compare the two files, and output the results into a temp
 * file. We then start a new shell window running vi to allow the user to
 * examine the difference file. Afterward, we prompt the user whether or not
 * to update the master file.
 */
include <stdio.h>
int
main ( argc, argv )
int        argc;
char       *argv[ ];
{
           int    Status;
           char   Command[1024], Buf[10];
           if ( argc != 3 ) {
                   fprintf ( stderr, "invalid number of args - terminating \n' );
                   exit( -1 );
           }
           sprintf ( Command, "diff -b %s %s > /tmp/MyFile \n", argv[1], argv[2] );
           system( Command );

sprintf ( Command, "shelltool vi /tmp/MyFile \n" );
           Status = system ( Command );
           if( Status != 0 ) {
                   fprintf ( stderr, "error reviewing differences - terminating\n" );
                   exit( -1 );
           }
           fprintf ( stdout, "Update master file (Y/N) ? n );
           Buf[0] = '\0';
           gets ( Buf, 10, stdin );
           if (( Buf[0O] == 'y' ) | | ( Buf[0] - 'Y' )) {
                   sprintf ( Command, "cp %s%s \n", argv[2], argv[1] );
                   Status = system ( Command );
                   if( Status != 0 ) {
                           fprintf ( stderr, "unable to update master\n" );
                           exit( -1 );
                   }
           }
           unlink ( "/tmp/MyFile" );
           exit( 0 );
}
```

Figure 8a

Test Name: sample
Results Path: /usr/pa/slemmo (Review) ⇨ ⇦ (Review All) (ReRun) (Done)

(Update Expected) (Done)

Expected Text: /usr/pa/slemmo/sample.result/tx1.tx ♦
Operations: ■Expected ■Actual ■Differences

| | | | | | | |
|---|---|---|---|---|---|---|
| | norm.resid machep x(1)-1 x(n)-1 | | | | | |
| | 19.00 4.5234e-05 1.1921e-07 -1.3113e-05 -1.3053 | | | | | |
| | times are reported for matrices of order 100 | | | | | |
| | sgefa sgesl total Kflops unit ratio | | | | | |
| | times for array with leading dimension of 201 | | | | | |
| CHG | 3.9000 | 0.10000 | 4.0000 | 172.00 | 11.650 | 71.430 |
| CHG | 3.9000 | 0.0000e+00 | 3.9000 | 176.00 | 11.360 | 69.640 |
| CHG | 3.9000 | 0.0000e+00 | 3.9600 | 173.00 | 11.530 | 70.710 |
| | 3.8800 | 0.0000e+00 | 3.8800 | 177.00 | 11.300 | 69.250 |
| | times for array with leading dimension of 200 | | | | | |
| | 3.7600 | 0.12000 | 3.8800 | 177.00 | 11.300 | 69.290 |
| CHG | 3.9200 | 0.0000e+00 | 3.9200 | 175.00 | 11.420 | 70.000 |
| CHG | 3.8600 | 0.0000e+00 | 3.8600 | 178.00 | 11.240 | 68.930 |
| CHG | 3.8800 | 0.0000e+00 | 3.8800 | 177.00 | 11.310 | 69.320 |
| | 3.8800 | 0.0000e+03 | | | | |
| | ROLLED SINGLE PRECISION LINPACK PERFORMANCE 177 K | | | | | |

↑ Master Data

| | | | | | |
|---|---|---|---|---|---|
| 3.8200 | 0.12000 | 3.9400 | 174.00 | 11.480 | 70.360 |
| 3.8800 | 0.0000e+00 | 3.8800 | 177.00 | 11.300 | 69.290 |
| 3.8800 | 0.0000e+00 | 3.8800 | 177.00 | 11.300 | 69.290 |
| 3.8800 | 0.0000e+00 | 3.8800 | 177.00 | 11.300 | 69.290 |
| 3.9000 | 0.0000e+00 | 3.9000 | 176.00 | 11.360 | 69.640 |
| 3.8800 | 0.0000e+00 | 3.8800 | 177.00 | 11.300 | 69.250 |

↑ ActualData

↑ Status

Figure 8b

(ecdqal:50) IRSbminfo bm1.bm -header

| | Xloc | Yloc | | |
|---|---|---|---|---|
| | 782 | 363 | | |
| Raster: | Width | Height | Depth | |
| | 240 | 372 | 8 | |
| Mask: | Xloc | Yloc | Width | Height |
| | 38 | 0 | 202 | 28 |

Figure 10b

| 0 | 32 | 64 | 96 |
|---|---|---|---|
| 1 | 33 | 65 | 97 |
| 2 | 34 | 66 | 98 |
| 3 | 35 | 67 | 99 |
| 4 | 36 | 68 | 100 |
| 5 | 37 | 69 | 101 |
| 6 | 38 | 70 | 102 |
| 7 | 39 | 71 | 103 |
| 8 | 40 | 72 | 104 |
| 9 | 41 | 73 | 105 |
| 10 | 42 | 74 | 106 |
| 11 | 43 | 75 | 107 |
| 12 | 44 | 76 | 108 |
| 13 | 45 | 77 | 109 |
| 14 | 46 | 78 | 110 |
| 15 | 47 | 79 | 111 |
| 16 | 48 | 80 | 112 |
| 17 | 49 | 81 | 113 |
| 18 | 50 | 82 | 114 |
| 19 | 51 | 83 | 115 |
| 20 | 52 | 84 | 116 |
| 21 | 53 | 85 | 117 |
| 22 | 54 | 86 | 118 |
| 23 | 55 | 87 | 119 |
| 24 | 56 | 88 | 120 |
| 25 | 67 | 89 | 121 |
| 26 | 68 | 90 | 122 |
| 27 | 69 | 91 | 123 |
| 28 | 70 | 92 | 124 |
| 29 | 71 | 93 | 125 |
| 30 | 72 | 94 | 126 |
| 31 | 73 | 95 | 127 |

Figure 11f

| | | | |
|---|---|---|---|
| SPREADSHEET | save_spread | IRScompTX | IRStextdiff | .wk |
| DB_DATA_AND_IDX | SaveDBandIndex | CompDBandIndex | ReviewDBandIndex | .dbi |
| DB_INDEX | SaveDBIndex | CompDBIndex | IRStextdiff | .di |
| SCREENWAIT | IRSsaveBM | ScreenDelay | IRSbitdiff | .sw |

Figure 12 sample.data/IrsApplications
sample.data/IrsFilters
sample.data/floating_prog*
sample.data/traffic icon

Figure 14a sample.irs/session.log
sample.irs/tx1.fltrs
sample.irs/time.log
sample.irs/passfail.log
sample.irs/bm2.bm
sample.irs/bm1.bm
sample.irs/tx1.tx
sample.irs/Version

Figure 14b tx1 149
COMPARE 2
bm1 39
COMPARE 5
bm2 17
COMPARE 2
End_of_test 25

Figure 14c

PASS CHECKPOINT Start_of_Test " "
PASS TEXTFILE tx1 "floating point data."
PASS BITMAP bm1 "iconedit screen"
PASS BITMAP bm2 "iconedit - icon image"
PASS CHECKPOINT End_of_test " "

Figure 14d

3.2 sun386 vermont slemmo

Figure 14e sample.result/passfail.log.FAIL
sample.result/passfail.log
sample.result/bm1.bm.FAIL
sample.result/bm1.bm
sample.result/tx1.tx
sample.result/tx1.tx.FAIL
sample.result/data

Figure 14f

0 0 0 0 /Comment 1
   IRSmacro generated session.log @Thu Mar 15 14:10:46 1990
0 40000 32 790 /Move Mouse
2 0 31 789 /Move Mouse
0 40000 32 790 /Move Mouse
5 0 31 789 /Move Mouse
0 40000 32 790 /Move Mouse
0 80000 32 790 /DownTransition i
0 100000 32 790 /UpTransition i
0 80000 32 790 /DownTransition c
0 100000 32 790 /UpTransition c
0 80000 32 790 /DownTransition o
0 100000 32 790 /UpTransition o
0 80000 32 790 /DownTransition n
0 100000 32 790 /UpTransition n
0 80000 32 790 /DownTransition e
0 100000 32 790 /UpTransition e
0 80000 32 790 /DownTransition d
0 100000 32 790 /UpTransition d
0 80000 32 790 /DownTransition i
0 100000 32 790 /UpTransition i
0 80000 32 790 /DownTransition t
0 100000 32 790 /UpTransition t
0 80000 32 790 /DownTransition <SP>
0 100000 32 790 /UpTransition <SP>
0 80000 32 790 /DownTransition -
0 100000 32 790 /UpTransition -
0 80000 32 790 /DownTransition 32530
0 80000 32 790 /DownTransition W
0 100000 32 790 /UpTransition W
0 100000 32 790 /UpTransition 32530
0 80000 32 790 /DownTransition p
0 100000 32 790 /UpTransition p
0 80000 32 790 /DownTransition <SP>
0 100000 32 790 /UpTransition <SP>
0 80000 32 790 /DownTransition 3
0 100000 32 790 /UpTransition 3
0 80000 32 790 /DownTransition 0
0 100000 32 790 /UpTransition 0
0 80000 32 790 /DownTransition 0
0 100000 32 790 /UpTransition 0
0 8 00 00 32 790 /DownTransition <SP>
0 100000 32 790 /UpTransition <SP>
0 80000 32 790 /DownTransition 3
0 100000 32 790 /UpTransition 3
0 80000 32 790 /DownTransition 0
0 100000 32 790 /UpTransition 0
0 80000 32 790 /DownTransition 0

Figure 18a-1

```
0 100000 32 790 /UpTransition 0
0 80000 32 790 /DownTransition <SP>
0 100000 32 790 UpTransition <SP>
0 80000 32 790 /DownTransition -
0 100000 32 790 /UpTransition -
0 80000 32 790 /DownTransition 32530
0 80000 32 790 /DownTransition W
0 100000 32 790 /UpTransition W
0 100000 32 790 /UpTransition 32530
0 80000 32 790 /DownTransition 32530
0 80000 32 790 /DownTransition P
0 100000 32 790 /UpTransition P
0 100000 32 790 /UpTransition 32530
0 80000 32 790 /DownTransition <SP>
0 100000 32 790 /UpTransition <SP>
0 80000 32 790 /DownTransition 3
0 100000 32 790 /UpTransition 3
0 80000 32 790 /DownTransition 0
0 100000 32 790 /UpTransition 0
0 80000 32 790 /DownTransition 0
0 100000 32 790 /UpTransition 0
0 80000 32 790 /DownTransition <SP>
0 100000 32 790 /UpTransition <SP>
0 00000 32 790 /DownTransition 3
0 100000 32 790 /UpTransition 3
0 80000 32 790 /DownTransition 0
0 100000 32 790 /UpTransition 0
0 80000 32 790 /DownTransition 0
0 100000 32 790 /UpTransition 0
0 80000 32 790 /DownTransition <SP>
0 100000 32 790 /UpTransition <SP>
0 80000 32 790 /DownTransition 32530
0 80000 32 790 /DownTransition &
0 100000 32 790 /UpTransition &
0 100000 32 790 /UpTransition 32530
0 80000 32 790 /DownTransition <CR>
0 100000 32 790 /UpTransition <CR>
5 0 31 789 /Move Mouse
0 40000 32 790 /Move Mouse
0 40000 38 788 /Move Mouse
0 40000 45 785 /Move Mouse
0 40000 52 782 /Move Mouse
0 40000 59 779 /Move Mouse
0 40000 66 776 /Move Mouse
0 40000 73 773 /Move Mouse
0 40000 80 771 /Move Mouse
0 40000 87 768 /Move Mouse
0 40000 94 765 /Move Mouse
```

Figure 18a-2

```
0 40000 101 762 /Move Mouse
0 40000 108 759 /Move Mouse
0 40000 115 756 /Move Mouse
0 40000 122 754 /Move Mouse
0 40000 129 751 /Move Mouse
0 40000 136 748 /Move Mouse
0 40000 143 745 /Move Mouse
0 40000 150 742 /Move Mouse
0 40000 157 739 /Move Mouse
0 40000 164 737 /Move Mouse
0 40000 171 734 /Move Mouse
0 40000 178 731 /Move Mouse
0 40000 185 728 /Move Mouse
0 40000 192 725 /Move Mouse
0 40000 199 722 /Move Mouse
0 40000 206 720 /Move Mouse
0 40000 213 717 /Move Mouse
0 40000 220 714 /Move Mouse
0 40000 227 711 /Move Mouse
0 40000 234 708 /Move Mouse
0 40000 241 705 /Move Mouse
0 40000 248 703 /Move Mouse
0 40000 255 700 /Move Mouse
0 40000 262 697 /Move Mouse
0 40000 269 694 /Move Mouse
0 40000 276 691 /Move Mouse
0 40000 283 689 /Move Mouse
0 40000 290 686 /Move Mouse
0 40000 297 683 /Move Mouse
0 40000 304 680 /Move Mouse
0 40000 311 677 /Move Mouse
0 40000 318 674 /Move Mouse
0 40000 325 672 /Move Mouse
0 40000 332 669 /Move Mouse
0 40000 339 666 /Move Mouse
0 40000 346 663 /Move Mouse
0 40000 353 660 /Move Mouse
0 40000 360 657 /Move Mouse
0 40000 367 655 /Move Mouse
0 40000 374 652 /Move Mouse
0 40000 381 649 /Move Mouse
0 40000 388 646 /Move Mouse
0 40000 395 643 /Move Mouse
0 40000 402 640 /Move Mouse
0 40000 409 638 /Move Mouse
0 40000 416 635 /Move Mouse
0 40000 423 632 /Move Mouse
0 40000 430 629 /Move Mouse
```

Figure 18a-3

```
0 40000 437 626 /Move Mouse
0 40000 444 623 /Move Mouse
0 40000 451 621 /Move Mouse
0 40000 458 618 /Move Mouse
0 40000 465 615 /Move Mouse
0 40000 472 612 /Move Mouse
0 40000 479 609 /Move Mouse
0 40000 486 606 /Move Mouse
0 40000 493 604 /Move Mouse
0 40000 500 601 /Move Mouse
0 40000 507 598 /Move Mouse
0 40000 514 595 /Move Mouse
0 40000 521 592 /Move Mouse
0 40000 528 589 /Move Mouse
0 40000 535 587 /Move Mouse
0 40000 542 584 /Move Mouse
0 40000 549 581 /Move Mouse
0 40000 556 578 /Move Mouse
0 40000 563 575 /Move Mouse
0 40000 570 572 /Move Mouse
0 40000 577 570 /Move Mouse
0 40000 584 567 /Move Mouse
0 40000 591 564 /Move Mouse
0 40000 598 561 /Move Mouse
0 40000 605 558 /Move Mouse
0 40000 612 556 /Move Mouse
0 40000 619 553 /Move Mouse
0 40000 626 550 /Move Mouse
0 40000 633 547 /Move Mouse
0 40000 640 544 /Move Mouse
0 40000 647 541 /Move Mouse
0 40000 654 539 /Move Mouse
0 40000 661 536 /Move Mouse
0 40000 668 S33 /Move Mouse
0 40000 675 530 /Move Mouse
0 40000 682 527 /Move Mouse
0 40000 689 524 /Move Mouse
0 40000 696 522 /Move Mouse
0 40000 703 519 /Move Mouse
0 40000 710 516 /Move Mouse
0 40000 717 513 /Move Mouse
0 40000 724 510 /Move Mouse
0 40000 731 507 /Move Mouse
0 40000 738 505 /Move Mouse
0 40000 745 502 /Move Mouse
0 40000 752 499 /Move Mouse
0 40000 759 496 /Move Mouse
0 40000 766 493 /Move Mouse
```

Figure 18a-4

```
0 40000 773 490 /Move House
0 40000 780 488 /Move Mouse
0 40000 787 485 /Move Mouse
0 40000 794 482 /Move Mouse
0 40000 801 479 /Move Mouse
0 40000 808 476 /Move Mouse
0 40000 815 473 /Move Mouse
0 40000 822 471 /Move Mouse
0 40000 829 468 /Move Mouse
0 40000 836 465 /Move Mouse
0 40000 843 462 /Move Mouse
0 40000 850 459 /Move Mouse
0 40000 857 456 /Move Mouse
0 40000 864 454 /Move Mouse
0 400B0 868 452 /Move Mouse
0 80000 868 452 /DownTransition MS_RIGHT
1 0 867 451 /Move Mouse
0 40000 868 452 /Move Mouse
0 80000 868 452 UpTransition MS_RIGHT
2 0 867 451 /Move Mouse
0 40000 868 452 /Move Mouse
0 40000 874 452 /Move Mouse
0 40000 881 452 /Move Mouse
0 40000 888 452 /Move Mouse
0 40000 895 452 /Move Mouse
0 40000 902 452 /Move Mouse
0 40000 909 452 /Move Mouse
0 40000 916 452 /Move Mouse
0 40000 923 452 /Move Mouse
0 40000 930 452 /Move Mouse
0 40000 937 452 /Move Mouse
0 40000 944 452 /Move Mouse
0 40000 951 452 /Move Mouse
0 40000 958 452 /Move Mouse
0 40000 965 452 /Move Mouse
0 40000 972 452 /Move Mouse
0 40000 979 452 /Move Mouse
0 40000 986 452 /Move Mouse
0 40000 993 452 /Move Mouse
0 40000 1000 452 /Move Mouse
0 80000 1000 452 /DownTransition MS_RIGHT
1 0 999 451 /Move Mouse
0 40000 1000 452 /Move Mouse
0 80000 1000 452 /UpTransition MS_RIGHT
2 0 999 451 /Move Mouse
0 40000 1000 452 /Move Mouse
0 40000 995 458 /Move Mouse
0 40000 990 465 /Move Mouse
```

Figure 18a-5

```
0 40000 985 472 /Move Mouse
0 40000 979 479 /Move Mouse
0 40000 974 486 /Move Mouse
0 40000 969 493 /Move Mouse
0 40000 963 500 /Move Mouse
0 40000 958 507 /Move Mouse
0 40000 953 514 /Move Mouse
0 40000 947 521 /Move Mouse
0 40000 942 528 /Move Mouse
0 40000 936 535 /Move Mouse
0 40000 931 542 /Move Mouse
0 40000 926 549 /Move Mouse
0 40000 920 SS6 /Move Mouse
0 40000 915 563 /Move Mouse
0 40000 910 570 /Move Mouse
0 40000 904 577 Move Mouse
0 40000 899 584 /Move Mouse
0 40000 894 591 /Move Mouse
0 40000 888 598 /Move Mouse
0 40000 883 605 /Move Mouse
0 40000 877 612 /Move Mouse
0 40000 872 619 /Move Mouse
0 40000 867 626 /Move Mouse
0 40000 861 633 /Move Mouse
0 40000 856 640 /Move Mouse
0 40000 851 647 /Move Mouse
0 50000 845 654 /Move Mouse
0 40000 840 661 /Move Mouse
0 40000 835 668 /Move Mouse
0 40000 830 674 /Move Mouse
0 80000 830 674 /DownTransition MS_RIGHT
1 0 829 673 /Move Mouse
0 40000 830 674 /Move Mouse
0 80000 830 674 /UpTransition MS_RIGHT
1 0 829 673 /Move Mouse
0 40000 830 674 /Move Mouse
0 40000 836 674 /Move Mouse
0 40000 843 674 /Move Mouse
0 40000 850 674 /Move Mouse
0 40000 857 674 /Move Mouse
0 40000 864 674 /Move Mouse
0 40000 871 674 /Move Mouse
0 40000 878 674 /Move Mouse
0 40000 885 674 /Move Mouse
0 40000 892 674 /Move Mouse
0 40000 898 674 /Move Mouse
0 80000 898 674 /DownTransition MS_RIGHT
1 0 897 673 /Move Mouse
```

Figure 18a-6

```
0 40000 898 674 /Move Mouse
0 80000 898 674 /UpTransition MS_RIGHT
1 0 897 673 /Move Mouse
0 40000 898 674 /Move Mouse
0 40000 904 674 /Move Mouse
0 40000 911 674 /Move Mouse
0 40000 918 674 /Move Mouse
0 40000 925 674 /Move Mouse
0 40000 932 674 /Move Mouse
0 40000 939 674 /Move Mouse
0 40000 946 674 /Move Mouse
0 40000 953 674 /Move Mouse
0 40000 956 674 /Move Mouse
0 80000 956 674 /DownTransition MS_RIGHT
1 0 955 673 /Move Mouse
0 40000 956 674 /Move Mouse
0 80000 956 674 /UpTransition MS_RIGHT
1 0 955 673 /Move Mouse
0 40000 956 674 /Move Mouse
0 40000 950 678 /Move Mouse
0 40000 943 683 /Move Mouse
0 40000 936 689 /Move Mouse
0 40000 929 694 /Move Mouse
0 40000 922 699 /Move Mouse
0 40000 915 704 /Move Mouse
0 40000 908 709 /Move Mouse
0 40000 901 714 /Move Mouse
0 40000 894 719 /Move Mouse
0 40000 887 724 /Move Mouse
0 40000 882 728 /Move Mouse
1 56000 882 728 /DownTransition MS_LEFT
0 80000 882 728 UpTransition MS_LEFT
1 0 B81 727 /Move Mouse
0 40000 882 728 /Move Mouse
0 40000 881 722 /Move Mouse
0 40000 879 715 /Move Mouse
0 40000 877 708 /Move Mouse
0 40000 875 701 /Move Mouse
0 40000 874 694 /Move Mouse
0 40000 872 687 /Move Mouse
0 40000 870 680 /Move Mouse
0 40000 869 673 /Move Mouse
```

Figure 18a-7

```
# IRSmacro generated session.log @ Thu Mar 15 14:10:46 1990
0 40000 32 790 /Move Mouse
2 0 31 789 /Move Mouse
0 40000 32 790 /Move Mouse
5 0 31 789 /Move Mouse
0 40000 32 790 /Move Mouse
2 800000 32 790 /KeyBoard iconedit<SP>-
Wp<SP>300<SP>300<SP>-WPcSP>300<SP>300<SP>&<  C
0 31 789 /Move Mouse
0 40000 32 790 /Move Mouse
0 40000 38 788 /Move Mouse
0 40000 45 785 /Move Mouse
0 40000 52 782 /Move Mouse
0 40000 59 779 /Move Mouse
0 40000 66 776 /Move Mouse
0 40000 73 773 /Move Mouse
0 40000 80 771 /Move Mouse
0 40000 87 768 /Move Mouse
0 40000 94 765 /Move Mouse
0 40000 101 762 /Move Mouse
0 40000 108 759 /Move Mouse
0 40000 115 756 /Move Mouse
0 40000 122 754 /Move Mouse
0 40000 129 751 /Move Mouse
0 40000 136 748 /Move Mouse
0 40000 143 745 /Move Mouse
0 40000 150 742 /Move Mouse
0 40000 157 739 /Move Mouse
0 40000 164 737 /Move Mouse
0 40000 171 734 /Move Mouse
0 40000 178 731 /Move Mouse
0 40000 185 728 /Move Mouse
0 40000 192 725 /Move Mouse
0 40000 199 722 /Move Mouse
0 40000 206 720 /Move Mouse
0 40000 213 717 /Move Mouse
0 40000 220 714 /Move Mouse
0 40000 227 711 /Move Mouse
0 40000 234 708 /Move Mouse
0 40000 241 705 /Move Mouse
0 40000 248 703 /Move Mouse
0 40000 255 700 /Move Mouse
0 40000 262 697 /Move Mouse
0 40000 269 694 /Move Mouse
0 40000 276 691 /Move Mouse
0 40000 283 689 /Move Mouse
0 40000 290 686 /Move Mouse
```

Figure 18b-1

```
0 40000 297 683 /Move Mouse
0 40000 304 680 /Move Mouse
0 40000 311 677 /Move Mouse
0 40000 318 674 /Move Mouse
0 40000 325 672 /Move Mouse
0 40000 332 669 /Move Mouse
0 40000 339 666 /Move Mouse
0 40000 346 663 /Move Mouse
0 40000 353 660 /Move Mouse
0 40000 360 657 /Move Mouse
0 40000 367 655 /Move Mouse
0 40000 374 652 /Move Mouse
0 40000 381 649 /Move Mouse
0 40000 388 646 /Move Mouse
0 40000 395 643 /Move Mouse
0 40000 402 640 /Move Mouse
0 40000 409 638 /Move Mouse
0 40000 416 635 /Move Mouse
0 40000 423 632 /Move Mouse
0 40000 430 629 /Move Mouse
0 40000 437 626 /Move Mouse
0 40000 444 621 /Move Mouse
0 40000 451 621 /Move Mouse
0 40000 458 618 /Move Mouse
0 40000 465 615 /Move Mouse
0 40000 472 612 /Move Mouse
0 40000 479 609 /Move Mouse
0 40000 486 606 /Move Mouse
0 40000 493 604 /Move Mouse
0 40000 500 601 /Move Mouse
0 40000 507 598 /Move Mouse
0 40000 514 595 /Move Mouse
0 40000 521 592 /Move Mouse
0 40000 528 589 /Move Mouse
0 40000 535 587 /Move Mouse
0 40000 542 584 /Move Mouse
0 40000 549 581 /Move Mouse
0 40000 556 578 /Move Mouse
0 40000 563 575 /Move Mouse
0 40000 570 572 /Move Mouse
0 40000 577 570 /Move Mouse
0 40000 584 567 /Move Mouse
0 40000 591 564 /Move Mouse
0 40000 598 561 /Move Mouse
0 40000 605 558 /Move Mouse
0 40000 612 556 /Move Mouse
0 40000 619 553 /Move Mouse
```

Figure 18b-2

```
0 40000 626 550 /Move Mouse
0 40000 633 547 /Move Mouse
0 40000 640 544 /Move Mouse
0 40000 647 541 /Move Mouse
0 40000 654 539 /Move Mouse
0 40000 661 536 /Move Mouse
0 40000 668 533 /Move Mouse
0 40000 675 530 /Move Mouse
0 40000 682 527 /Move Mouse
0 40000 689 524 /Move Mouse
0 40000 696 522 /Move Mouse
0 40000 703 519 /Move Mouse
0 40000 710 516 /Move Mouse
0 40000 717 513 /Move Mouse
0 40000 724 510 /Move Mouse
0 40000 731 507 /Move Mouse
0 40000 738 505 /Move Mouse
0 40000 745 502 /Move Mouse
0 40000 752 499 /Move Mouse
0 40000 759 496 /Move Mouse
0 40000 766 493 /Move Mouse
0 40000 773 490 /Move Mouse
0 40000 780 488 /Move Mouse
0 40000 787 485 /Move Mouse
0 40000 794 482 /Move Mouse
0 40000 801 479 /Move Mouse
0 40000 808 476 /Move Mouse
0 40000 815 473 /Move Mouse
0 40000 822 471 /Move Mouse
0 40000 829 468 /Move Mouse
0 40000 836 465 /Move Mouse
0 40000 843 462 /Move Mouse
0 40000 850 459 /Move Mouse
0 40000 857 456 /Move Mouse
0 40000 864 454 /Move Mouse
0 40000 868 452 /Move Mouse
0 80000 868 452 /DownTransition MS_RIGHT
1 0 867 451 /Drag Mouse
0 40000 868 452 /Drag Mouse
0 80000 868 452 /UpTransition MS_RIGHT
2 0 867 451 /Move Mouse
0 40000 868 452 /Move Mouse
0 40000 874 452 /Move Mouse
0 40000 881 452 /Move Mouse
0 40000 888 452 /Move Mouse
0 40000 895 452 /Move Mouse
0 40000 902 452 /Move Mouse
```

Figure 18b-3

```
0 40000 909 452 /Move Mouse
0 40000 916 452 /Move Mouse
0 40000 923 452 /Move Mouse
0 40000 930 452 /Move Mouse
0 40000 937 452 /Move Mouse
0 40000 944 452 /Move Mouse
0 40000 951 452 /Move Mouse
0 40000 958 452 /Move Mouse
0 40000 965 452 /Move Mouse
0 40000 972 452 /Move Mouse
0 40000 979 452 /Move Mouse
0 40000 986 452 /Move Mouse
0 40000 993 452 /Move Mouse
0 40000 1000 452 /Move Mouse
0 80000 1000 452 /DownTransition MS_RIGHT
1 0 999 451 /Drag Mouse
0 40000 1000 452 /Drag Mouse
0 80000 1000 452 /UpTransition MS_RIGHT
2 0 999 451 /Move Mouse
0 40000 1000 452 /Move Mouse
0 40000 995 458 /Move Mouse
0 40000 990 465 /Move Mouse
0 40000 985 472 /Move Mouse
0 40000 979 479 /Move Mouse
0 40000 974 486 /Move Mouse
0 40000 969 493 /Move Mouse
0 40000 963 500 /Move Mouse
0 40000 958 507 /Move Mouse
0 40000 953 514 /Move Mouse
0 40000 947 521 /Move Mouse
0 40000 942 528 /Move Mouse
0 40000 936 535 /Move Mouse
0 40000 931 542 /Move Mouse
0 40000 926 549 /Move Mouse
0 40000 920 556 /Move Mouse
0 40000 915 563 /Move Mouse
0 40000 910 570 /Move Mouse
0 40000 904 577 /Move Mouse
0 40000 899 584 /Move Mouse
0 40000 894 591 /Move Mouse
0 40000 888 598 /Move Mouse
0 40000 883 605 /Move Mouse
0 40000 877 612 /Move Mouse
0 40000 872 619 /Move Mouse
0 40000 867 626 /Move Mouse
0 40000 861 633 /Move Mouse
0 40000 856 640 /Move Mouse
```

Figure 18b-4

```
0 40000 851 647 /Move Mouse
0 40000 845 654 /Move Mouse
0 40000 840 661 /Move Mouse
0 40000 835 668 /Move Mouse
0 40000 830 674 /Move Mouse
0 80000 830 674 /DownTransition MS_RIGHT
1 0 829 673 /Drag Mouse
0 40000 830 674 /Drag Mouse
0 80000 830 674 UpTransition MS_RIGHT
1 0 829 673 /Move Mouse
0 40000 830 674 /Move Mouse
0 40000 836 674 /Move Mouse
0 40000 843 674 /Move Mouse
0 40000 850 674 /Move Mouse
0 40000 857 674 /Move Mouse
0 40000 864 674 /Move Mouse
0 40000 871 674 /Move Mouse
0 40000 878 674 /Move Mouse
0 40000 885 674 /Move Mouse
0 40000 892 674 /Move Mouse
0 40000 898 674 /Move Mouse
0 80000 898 674 /DownTransition MS_RIGHT
1 0 897 673 /Drag Mouse
0 40000 898 674 /Drag Mouse
0 80000 898 674 /UpTransition MS_RIGHT
1 0 897 673 /Move Mouse
0 40000 898 674 /Move Mouse
0 40000 904 674 /Move Mouse
0 40000 911 674 /Move Mouse
0 40000 918 674 /Move Mouse
0 40000 925.674 /Move Mouse
0 40000 932 674 /Move Mouse
0 40000939 674 /Move Mouse
0 40000 946 674 /Move Mouse
0 40000 953 674 /Move Mouse
0 40000 956 674 /Move Mouse
0 80000 956 674 /DownTransition MS_RIGHT
1 0 95S 673 /Drag Mouse
0 40000 956 674 /Drag Mouse
0 80000 956 674 /UpTransition MS_RIGHT
1 0 955 673 /Move Mouse
0 40000 956 674 /Move Mouse
0 40000 950 678 /Move Mouse
0 40000 943 683 /Move Mouse
0 40000 936 689 /Move Mouse
0 40000 929 694 /Move Mouse
0 40000 922 699 /Move Mouse
```

Figure 18b-5

```
0 40000 915 704 /Move Mouse
0 40000 908 709 /Move Mouse
0 40000 901 714 /Move Mouse
0 40000 894 719 /Move Mouse
0 40000 887 724 /Move Mouse
0 40000 882 728 /Move Mouse
1 56000 882 728 /DownTransition MS_LEFT
0 80000 882 728 /UpTransition MS_LEFT
1 0 881 727 /Move Mouse
0 40000 882 728 /Move Mouse
0 40000 881 722 /Move Mouse
0 40000 879 715 /Move Mouse
0 40000 877 708 /Move Mouse
0 40000 875 701 /Move Mouse
0 40000 874 694 /Move Mouse
0 40000 872 687 /Move Mouse
0 40000 870 680 /Move Mouse
0 40000 869 673 /Move Mouse
0 40000 867 666 /Move Mouse
0 40000 865 659 /Move Mouse
0 40000 864 652 /Move Mouse
0 40000 862 645 /Move Mouse
0 40000 860 638 /Move Mouse
0 40000 858 631 /Move Mouse
0 40000 857 624 /Move Mouse
0 40000 855 617 /Move Mouse
0 40000 853 610 /Move Mouse
0 40000 852 603 /Move Mouse
0 40000 850 596 /Move Mouse
0 40000 848 589 /Move Mouse
0 40000 847 582 /Move Mouse
0 40000 845 575 /Move Mouse
0 40000 843 568 /Move Mouse
0 40000 841 561 /Move Mouse
0 40000 840 554 /Move Mouse
0 40000 838 547 /Move Mouse
0 40000 836 540 /Move Mouse
0 40000 835 533 /Move Mouse
0 40000 833 526 /Move Mouse
0 40000 831 519 /Move Mouse
0 40000 830 512 /Move Mouse
0 40000 828 505 /Move Mouse
0 40000 826 498 /Move Mouse
0 40000 824 491 /Move Mouse
0 40000 823 484 /Move Mouse
0 40000 822 481 /Move Mouse
1 56000 822 481 /DownTransition MS_LEFT
```

Figure 18b-6

```
0 80000 822 481 /UpTransition MS_LEFT
2 0 821 480 /Move Mouse
0 40000 822 481 /Move Mouse
0 40000 821 487 /Move Mouse
0 40000 819 494 /Move Mouse
0 40000 817 501 /Move Mouse
0 40000 816 508 /Move Mouse
0 40000 814 515 /Move Mouse
0 40000 813 522 /Move Mouse
0 40000 811 529 /Move Mouse
0 40000 809 536 /Move Mouse
0 40000 808 543 /Move Mouse
0 40000 806 550 /Move Mouse
0 40000 805 555 /Move Mouse
1 56000 805 555 /DownTransition MS_LEFT
0 80000 805 555 /UpTransition MS_LEFT
0 0 1007 377 /Bitmap MetaSave 1007 378 "" "Options are set
correctly"
1 0 804 554 /Move Mouse
0 40000 805 555 /Move Mouse
0 40000 799 553 /Move Mouse
0 40000 792 550 /Move Mouse
0 40000 785 548 /Move Mouse
0 40000 778 545 /Move Mouse
0 40000 771 543 /Move Mouse
0 40000 764 540 /Move Mouse
0 40000 757 538 /Move Mouse
0 40000 750 535 /Move Mouse
0 40000 743 533 /Move Mouse
0 40000 736 530 /Move Mouse
0 40000 729 527 /Move Mouse
0 40000 722 525 /Move Mouse
0 40000 715 522 /Move Mouse
0 40000 708 520 /Move Mouse
0 40000 701 517 /Move Mouse
0 40000 694 515 /Move Mouse
0 40000 687 512 /Move Mouse
0 40000 680 510 /Move Mouse
0 40000 673 507 /Move Mouse
0 40000 666 505 /Move Mouse
0 40000 659 502 /Move Mouse
0 40000 652 499 /Move Mouse
0 40000 645 497 /Move Mouse
0 40000 638 494 /Move Mouse
0 40000 631 492 /Move Mouse
0 40000 624 489 /Move Mouse
0 40000 617 487 /Move Mouse
```

Figure 18b-7

0 40000 610 484 /Move Mouse
0 40000 603 482 /Move Mouse
0 40000 596 479 /Move Mouse

Figure 18b-8

```
#include "IRSascii.h"
#include "IRStext.h"
#include "iconedit_test.h"

/ *start iconedit

GOTO_IRS_SHELL
START_ICONEDIT

/* set the options */

SELECT_SIZE(SIZE_ICON_SELECT)
SELECT_GRID(GRID_OFF_SELECT)

/* LOAD In src mode */
SET_LOAD(OP_SRC_SELECT)

/* FILL ln src mode */
SET_FILL(OP_SRC_SELECT)

/* PROOF in src mode */
SET_PROOF(OP_SRC_SELECT)

/* select root background pattern */
move OP_PATTERN_ROOT
click left
wait 1

/* options have been set */

/* empty the window */
CLEAR_ICONEDIT

/* draw a horizontal line */
move LINE_CHOICE
click left bitcomp meta ICONEDIT_DIR "Options are set correctly"
```

Figure 19a-1

```
wait 1
move TL_PIXEL
move PIXEL_10_LEFT
move PIXEL_10_DOWN
move +0 +4
down left
move PIXEL_10_LEFT
up left
wait 2 check that the line was drawn correctly */
ALL_BITCOMP("Horizontal Line Big Window",TL_PIXEL,+250 +25
bitcomp 868 755 928 812 "Horiztonal Line Small Window"

/* bring down the iconedit window*/
STOP_ICONEDIT

/* stop the test*/
CLICK_STOP_BUTTON
```

/* define window borders */
#define ICONEDIT_WINDOW_TL   300      300
#define ICONEDIT_WINDOW_BR   1026     839
#define ICONEDIT_LABEL_ER    1026     315

/* used to expose iconedit (usually after IRS appears on top of it*/
#define EXPOSED_ICONEDIT_LABEL 834 306

/* used for compares */
#define ICONEDIT_BIG_WINDOW   309 365 770 832
define ICONEDIT_SMALL_WINDOW 784 742 1018 832 define TL_PIXEL      320    379
define PIXEL_LEFT    +7     +0
#define PIXEL_RIGHT   -7     +0
#define PIXEL_DOWN    +0     +7
#define PIXEL_UP      -0     -7
#define PIXEL_10_LEFT    +70   +0
#define PIXEL_10_RIGHT   -70   +0
#define PIXEL_10_DOWN    +0    +70
#define PIXEL_10_UP      +0    -70

/* closed location */
#define ICONEDIT_ICON        333    333

/8 important function/button/text/menu selections */
#define ICONEDIT_DIR         1007   378
define ICONEDIT_FILE        1007   399 define LOAD_BUTTON          813    426
define STORE_BUTTON         868    426
#define BROWSE_BUTTON        926    426
define QUIT_ BUTTON         990    426 define SIZE_CYCLE           868    452
define SIZE_ICON_SELECT            +0    +10
define SIZE_CURSOR_SELECT          +0    +20 define GRID_CYCLE    1000 452
define GRID_OFF_SELECT     +0    +0
#define GRID_ON_SELECT      +0    +20
```

Figure 19b-1

```
#define CLEAR_BUTTON              822    481
#define FILL_BUTTON               901    481
define INVERT_BUTTON             984    481 define POINT_CHOICE              805    525
define LINE_CHOICE               805    555 define SQUARE_CHOICE             805    585
define SQUARE_FILL_CYCLE         894    579 define CIRCLE_CHOICE             805    615
define CIRCLE_FILL_CYCLE         894    607 define TEXT_CHOICE               805    645
define TEXT_SIZE_CYCLE           894    607 define FILL_BORDER_SELECT        +0     +0
define FILL_WHITE_SELECT         +0     +20
#define FILL_25_SELECT            +0     +40
#define FILL_ROOT_SELECT          +0     +60
#define FILL_50_SELECT            +0     +80
#define FILL_75_SELECT            +0     +100
define FILL_BLACK_SELECT         +0     +120 define TEXT_7pt_SELECT           +0     +00
define TEXT_11pt_SELECT          +0     +20
#define TEXT_12ptBOLD_SELECT      +0     +40
#define TEXT_14pt SELECT          -0     +60
 #define TEXT_14pt BOLD_SELECT    +0     +80
#define TEXT_14ptMOD_SELECT       +0     +100
#define TEXT_14ptMODBOLD_SELECT   +0     +120
define TEXT_ 19pt SELECT         +0     +140 define TEXT VALUE       1020        650 define LOAD_CYCLE       830    674
define FILL_CYCLE       898    674
define PROOF_CYCLE      956    674 define OP_SRC_SELECT             +0     +0
define OP_OR_SELECT              +0     +20
#define OP_XOR_SELECT             +0     +40
#define OP_AND_SELECT             -0     -60
```

Figure 19b-2

```
#define OP_PATTERN_WHITE      822  728
#define OP_PATTERN_25         852  828
~definc OP_PATTERN_ROOT       882  728
#define OP_PATTERN_50         912  728
#define OP_PATTERN_75         942  728
#define OP_PATTERN_BLACK      972  728

/* operations */
#define START_ICONEDIT \
    wait 5 \
    keyboard "iconedit -Wp 300 300 -WP 300 300 &<CR>" \
    wait 5 define INVERT_ICONEDIT \
    move INVERT_BUTTON\
    click left\
    wait 2 define FILL_ICONEDIT \
    move FILL_BUTTON \
    click left \
    wait 2 define CLEAR_ICONEDIT \
    move CLEAR_BUTTON \
    click left \
    wait 2 define STOP_ICONEDIT \
    move QUIT_BUTTON \
    click left \
    wait 2 \
    keyboard "<CR>" \
    wait 5 define CHECK_BIG_WINDOW(desc) \
    bitcomp ICONEDIT_BIG_WINDOW desc define CHECK_SMALL_WINDOW(desc) \
    bitcomp ICONEDIT_SMALL_WINDOW desc
```

Figure 19b-3

```
#define SELECT_GRID(pos) \
    move GRID_CYCLE
    down right \
    wait 1 \
    move pos \
    up right \
    wait 2 define SELECT_SIZE(pos) \
    move SIZE_CYCLE \
    down right \
    wait 1 \
    move pos \
    up right \
    wait 2 define LOAD_ICON(iconname) \
    move ICONEDIT_FILE \
    KEYSTROKE(RiqhtArrow Key) \
    down Ctrl \
    KEYSTROKE(z) up Ctrl \
    keyboard iconname \
    move LOAD_BUTTON \
    click left \
    wait 5 define SET_DIRECTORY(dirname) \
    move ICONEDIT_DIR \
    KEYSTROKE(RightArrow Key) \
    down Ctrl \ KEYSTROKE(z) \
    up Ctrl \
    keyboard dirname \
    wait 5 define SET_LOAD(to) \
    move LOAD_CYCLE \
    down right \
    wait 1 \
    move to \
    up right \
    wait 1
```

Figure 19b-4

```
#define SET_FILL(to) \
    move FILL_CYCLE down right \
    wait 1 \
    move to \
    up right \
    wait 1 define SET_PROOF (to) \
    move PROOF CYCLE \
    down right \
    wait 1 \
    move to \
    up right \
    wait 1 define SET_CIRCLE_FILL (to) \
    move CIRCLE_FLL_CYCLE \
    down right \
    wait 1 \
    move to \
    up right \
    wait 1 define SET_SQUARE_FILL(to) \
    move SQUARE_FILL_CYCLE \
    down right \
    wait 1 \
    move to \
    up right \
    wait 1
```

Figure 19b-5

Events Performed in Journal File

USER EXTENSIBLE TESTING SYSTEM

BACKGROUND OF THE INVENTION

1. Field of the Invention

The system of the present invention relates to the automated testing of computer systems. More particularly the system of the present invention relates to the automated testing of computer application software in a window systems environment.

2. Related Applications

This invention is related to U.S. patent application Ser. No. 07/498,206, filed Mar. 23, 1990, entitled "Synchronized Journaling System".

3. Art Background

During the development of software, there is a need to exhaustively test the software before releasing it to customers for use. Initially, tests were performed by a user manually operating the software and performing different operations until all perceivable functions of the software were tested. As software became more sophisticated and complicated, the need to automate testing became more important. It also became desirable to be able to accurately repeat testing of software so that the testing was standardized and as the software was modified, the same test could be used to test the reliability and performance of the software.

To meet this need, various testing systems have been developed. For example, the following testing systems are exemplary of the testing systems available:

DEC/TEST MANAGER, manufactured by Digital Equipment Corp., Maynard, Mass.; and

CAPBAK/SMARTS, manufactured by Software Research, Inc., San Francisco, Calif.

However, a need still exists to provide automated testing systems that can test a wide variety of software programs across different types of hardware architectures in which the testing system is flexible as to the testing parameters and results and is user extensible, that is, the systems can be easily tailored to the specific software to be tested. A need also exists for automated testing systems in which the testing procedure and parameters can be modified interactively with the running of the tests. Furthermore, a need exists for automated testing systems which are simple to use and do not require extensive knowledge fo the intricacies of the testing system.

SUMMARY OF THE INVENTION

It is therefore an object of the present invention to provide an automated testing system that can test a wide variety of software programs across different types of hardware architectures in which the testing system is flexible as to the testing parameters and results and is user extensible.

It is also an object of the present invention to provide an automated testing system in which the testing procedure and parameters can be modified interactively with the running of the tests on the software.

It is an object of the present invention to provide an automated testing system which is simple to use and does not require extensive knowledge of the intricacies of the testing system.

A user extensible, automated testing system comprises a plurality of modules, each of which is user extensible. The journal module provides the ability to record events representative of user actions taken to execute certain tasks which farm the test. The filter module provides the means to filter out data which is not determinative of the pass or fail status of a test. The save data module provides the means to save data which subsequently compared to master data to determine the pass/fail status of the test. The compare module provides the means to compare the data saved with the master data to determine differences between the data and therefore the pass/fail status of the test. The review module provides a graphical review of the differences between the master data and actual data. Each module is user extensible whereby the user may update, change or delete portions of the module functionality in order to tailor the testing system to a particular computer system or computer software application.

BRIEF DESCRIPTION OF THE DRAWINGS

The objects, features and advantages of the present invention will be apparent from the following description of the invention in which:

FIGS. 3a and 3b are illustrative filter functions employed in the preferred embodiment of the testing system of the present invention.

FIGS. 5a and 5b respectively illustrate data before and after input through a filter.

FIG. 6a is an illustrative save data function and FIG. 6b is illustrative of the selection of a save data function from the menu.

FIG. 7a is an illustrative comparison function.

FIG. 8a is an illustrative review function and FIG. 8b is the data displayed according to the review function.

FIG. 10b illustrates the mask data stored with the master data.

FIGS. 11a, 11b, 11c, 11d, 11e and 11f illustrate the small differences feature in the review module of the best preferred embodiment of the testing system of the present invention.

FIG. 12 is illustrative of the contents of the IrsApplications file containing a listing of each save/compare/review sequence available in the preferred embodiment of the testing system of the present invention.

FIG. 14a illustrates the contents of a data directory employed by the testing system of the present invention, FIG. 14b illustrates the contents of a test directory after capture of a test, FIG. 14c illustrates the contents of a time log generated by the testing system of the present invention, FIG. 14d is illustrative of a pass/fail log generated by the testing system of the present invention, FIG. 14e is illustrative of the contents of a version file generated by the testing system of the present invention, and FIG. 14f illustrates the contents of a working directory after execution of a test.

FIGS. 18a-1 through 18a-7 illustrate a journal file in ASCII format and FIGS. 18b-1 through 18b-8 illustrates a journal file in a higher level format.

FIGS. 19a-1 and 19a-2 and 19b 19b-1 through 19b-5 illustrate the macro language utilized to define a test in the testing system of the present invention.

DETAILED DESCRIPTION OF THE INVENTION

Notation and Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Description

Figure 1:
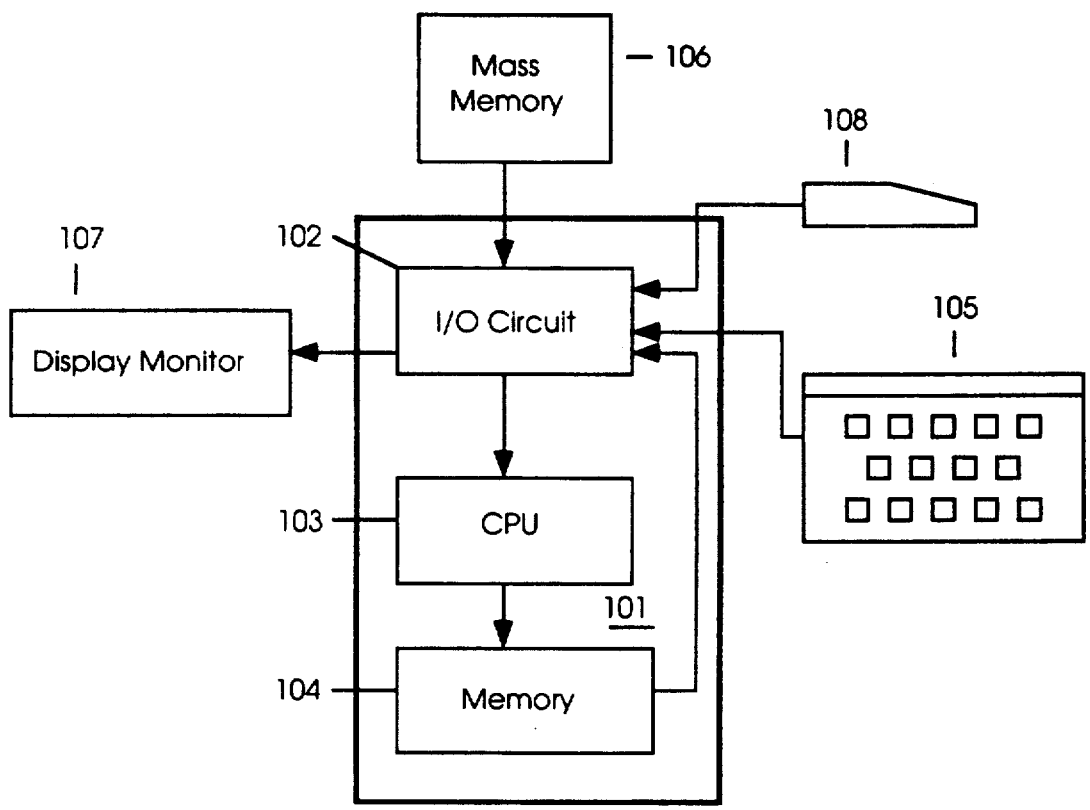
FIG. 1 is illustrative of computer system employed in the testing system of the present invention.

FIG. 1 shows a typical computer-based system for a user extensible testing system according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, California. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. A cursor control 108 is used to select command modes and edit the input data, and in general provides a more convenient means to input information into the system.

Process Description

Figure 2:
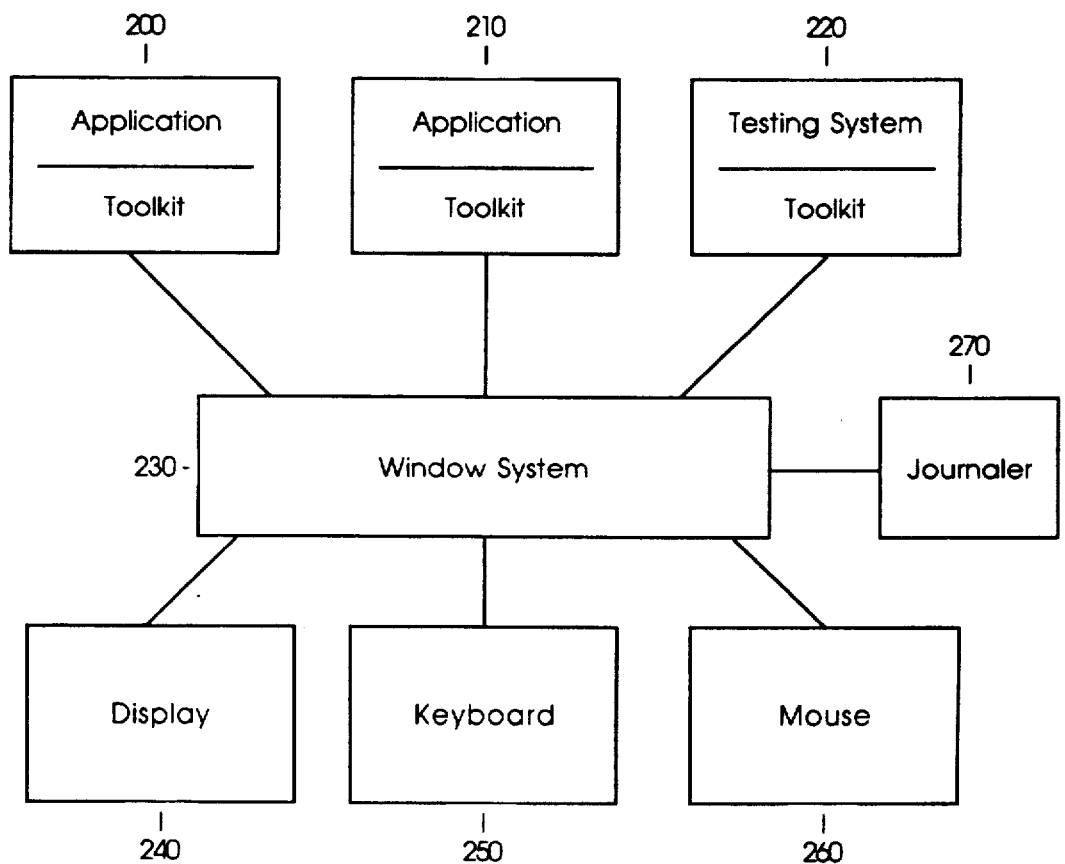
FIG. 2 is a block diagram representation of the testing system of the present invention implemented in a window system environment.

The testing system of the present invention can be generally described with reference to FIG. 2. A plurality of applications 200, 210 operate in a window system environment through the window system 230. The applications 200, 210 received information through the keyboard and mouse input devices 250, 260 and output information to be displayed on display device 240.

The active window, that is, the window which has the input focus, dictates which application receives the input from the input devices 250, 260. The application in the active window dictates where the output data is to be displayed.

Preferably, the testing system of the present invention 220 is implemented as an additional process operating within the window system. However, the testing system may also be implemented as a separate process on a connected device. The journaling mechanism 270, provides the basic capability of recording the events in a journal file representative of user actions taken to initiate and execute certain tasks to test the computer system and/or software operating on the computer system. The journal file is subsequently replayed, whereby each event recorded is read from the journal file and input to the window system in the sequence recorded. The window system responds to the events as if the events were received from the input devices 250, 260 whereby the test is executed. Preferably a synchronized journaling system is employed, such as that described in copending patent applications U.S. Ser. No. 07/498,206, filed Mar. 23, 1990, entitled "Synchronized Journaling System".

The testing system of the present invention comprises a plurality of user extensible modules, such that a user may update, change or delete portions of the module functionality in order to tailor the testing system to a particular computer system or computer software application. The testing system 220 is implemented in conjunction with the journaling mechanism 270 in order to provide a user extensible automated testing capability. The testing system is implemented as an additional process operating within the window system in order to take advantage of the features of the journaling mechanism. The actions taken by a user to enable certain features of the testing system and initiate certain tests are reflected as a series of events in the window system and are recorded by the journaling mechanism. For example, the act of enabling a certain filter for a subsequent test may be reflected as a series of mouse events wherein the mouse moves the cursor to the position on the display where the filter is displayed as a menu item, depression and release of a key on the keyboard or a mouse button to indicate selection of the filter. During replay of the journal file, the user actions taken with respect to enabling the certain features of the testing system and initiating certain tests as well as those user actions taken with respect to testing the application are executed. Thus, features such as saving data, performing comparisons, enabling filters and the like are consistently implemented for a particular application test, insuring that the identical test is performed repeatedly.

The user extensible testing system of the present invention comprises a journaling module, a filtering module, a save data module, a compare data module, a review module, and a replay/edit module. As described above, the journaling module records all events that take place within the window system and places them in a journal file for subsequent replay. During replay, these events are output from the journal file into the window system, whereby the events are executed, thereby simulating the user actions of the user sessions initially recorded.

The filter module provides a filtering mechanism to filter out data which is not determinative of the pass or fail status of a test. The filter module is composed of filter functions, each separately identified, such that individual filter functions can be enabled for certain tests. These filter functions are executed by a filter function execution means to filter data prior to saving data during the execution of a test. The filter functions can be standardized for all types of data comparisons, standardized for a particular application or data comparison, or can be application specific and user definable. Through the filter function modification needs, filter functions can be deleted, added, or modified. The filter functions can be developed for text data as well as binary data including bit maps of digital images.

The filter functions comprise code which can be executed by the filter execution means. For example, the filter function may be written in a well known programming language (such as the "C" programming language), a programming language developed specifically for and optimized for filter functions, or low level code. The filter function modification means may simply be an ASCII text editor which permits a user to create new filter functions, modify existing filter functions or delete those filter functions which are no longer used. Alternatively, the filter function modification means may be an editor specifically tailored to modifying the filter function code. The filter execution means causes the execution of the filter function prior to the saving of text data generated during execution of a test. Preferably, the filter execution means initiates the executable code representative of the filter function. However, if the filter function was created or modified in a high level programming language (e.g., the "C" programming language), the filter function has to be compiled and translated into executable code prior to execution. This may be performed by a filter function modification means or filter execution means which includes that functionality. Alternatively, the filter function execution means is a language or code interpreter which interprets the code of the filter function and executes tasks specified by the code. Preferably, the filter functions are written in a high level programming language which is compiled into executable code after creation or modification and stored in executable form for subsequent execution.

A filter function may be as simple as filtering out blank spaces between words of text, or as complex as filtering out specific portions of data embodied in a textual or binary format file. For example, a filter may translate data from one format to another or translate any floating point number to a floating point number having a predetermined precision. Preferably, filters are used to eliminate those portions of data which may change when an application is reexecuted and does not affect the pass or failure status of the test. For example, if the data reviewed and compared to determine the pass or failure status of a test reflects a date and time of the execution, an error status will always be noted because the date and time changes each time the test is executed. Thus even though the test may have complete without any error changes in the data will be noted and the test will be identified by a failure status, because the date and time of the test had changed. To this problem a filter function is executed which reads the data to be saved and determines if the data includes the date and/or time of execution. If it does, the information is not saved. When a save data function is executed and the filter function is enabled, the filter execution means will cause the data to be input through the filter function thereby eliminating any time or date information from the data saved.

Examples of filter functions are illustrated in FIGS. 3a and 3b. FIG. 3a represents the code for a filter function referred to as "IRSfloat". IRSfloat receives a text file as input and determines whether the text includes floating point numbers. For each floating point number found in the text, the absolute value of the number is determined to measure the size of the number in order to determine the output format of the number e.g., exponential ("E") or floating point ("F") format. Once the size of the number and the format is determined, the floating point number is output from the filter with a precision of five digits.

FIG. 3b represents the code for a filter function referred to as "IRSspace". IRSspace receives a text file as input and eliminates multiple adjacent spaces or tabs. If more than one adjacent space or tab is found in the text, only the first space or tab is output from the filter.

The IRSfloat filter function is written in the UNIX ® operating system (UNIX is a trademark of AT&T) "LEX" language. The IRSspace filter function is written in the "C" programming language. These functions are subsequently compiled into executable code for subsequent execution by the filter execution means when the filters are selected. For further information on the LEX language, see Leek and Schmidt, *LEX—A Lexical Analyzer Generator* (Bell Laboratories, Murray Hill, New Jersey). Although the filter functions illustrated are written in the LEX and C languages, the filter functions are not limited as such and can be generated in any form or language compatible with the testing system.

Figures 4A, 4B:
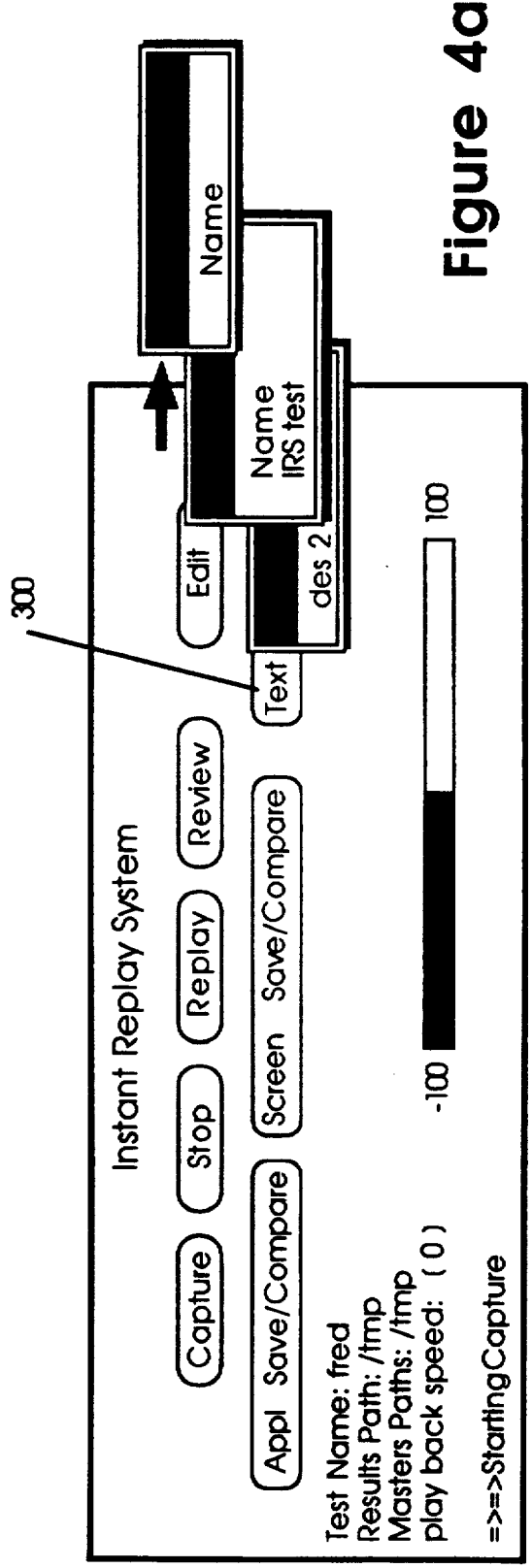
FIG. 4a illustrates a filter function menu employed in the preferred embodiment of the present invention and FIG. 4b illustrates a filter function list.

To enable a filter function, the user, during the capture sequence, selects a menu item which causes the particular filter function or functions to be selected. An exemplary filter function menu is shown in FIG. 4a. The filter function menu displays all available filter functions that can be implemented for a particular data save/compare or a particular test. For example, the filter functions IRSfloat and IRSspace are pull right menu items from the menu item "Text Save" 300 located in the main menu as shown in FIG. 4a.

The menu is generated to provide the ability to select one or more filter functions. Preferably a list of filter functions is provided which is accessed by the portion of the testing system which generates the menu and interfaces with the window system to display the window. For further information on the generation of menus in window systems, see, for example, *SunView TM 1 Programmer's Guide*, Chapter 12, "Menus" (1988). To add or delete filter functions from the menu, the filter file is simply updated to insert or remove the names of the filter functions to be added or deleted. An illustration of a filter function list is shown in FIG. 4b. The "%%" string delineates menu levels. The IRSfloat filter function is located at the second level and the IRSspace filter function is located at the third menu level.

The filter functions of the testing system of the present invention are user extensible. To add a filter function to the testing system, the user creates a filter function identifying the steps to execute in order to filter the input data. The filter function name is added to the filter list file at the menu level desired to display the filter function as a menu item. To modify a filter function, the user accordingly edits the filter function code to change the functionality of the filter. To delete a filter function, the user deletes the filter function file and removes the filter function name from the filter list so the filter function is not displayed on the menu.

The filter functions can be pipelined together such that a plurality of filter functions will be sequentially performed on data before it is saved and subsequently compared to determine the pass or fail state of a test. This is illustrated in FIGS. 5a and 5b. FIG. 5a shows a text file which includes a number of floating point numbers as well as extra blank spaces and tabs between words in the text. The user in the present illustration has decided that the number value and not the format is what determines the pass or fail status of the test. Thus, the user has enabled the filter IRSfloat to insure that all floating point numbers are in the same format and differences will be detected only if the number is different. Similarly, the user has enabled the IRSspace filter to remove the extra spaces and tabs which may occur and do not reflect upon the pass or fail status of the test. The data output after execution of the filter functions is illustrated in FIG. 5b. The floating point numbers are all in the same format and the extra spaces and tabs have been eliminated to provide the data which is subsequently compared to determine the pass or fail status of a test.

Another module contained in the user extensible testing system of the present invention is the save data module which provides the capability in the testing system to save data during execution of the test, the data being determinative of the pass/fail status of the test. The data saved is subsequently compared to expected data, referred to as the master data. If the data saved is not the same as the master data, the companion fails resulting in a test failure status.

The save data module consists of at least one save data function which determines what data is to be saved and the format the data is to be saved in. The save data module also consists of a save data execution means to execute the save data functions such as a language interpreter or a means for executing executable code. For example, a system call is made by testing system during capture or replay to execute the save data module without exiting the testing system. For example, in UNIX, this is achieved using the system call "System" (See *SunOS TM Reference Manual* (May 1988)) A save data modification means modifies the save data functions such that the user can add, delete, or change existing functions in order to tailor the saved data functions to a particular application. Preferably, the information provided to the save data modules is the type of data to be saved, where the data is located (the identity of the data) and where to share the data saved. For example, to save text data, the save data module would be provided with the name of the text file containing the data to be saved and the name of the file to save the text data in. If the data to be saved is a bit map image, the save data module is provided with the screen coordinates of the image to be saved and the name of the file in which to save the bit map image data. Preferably, this information is predetermined according to the save data function such that selection of a particular save data function will automatically provide the necessary information.

FIG. 6a illustrates a simple save data function which saves text by copying one byte at a time the file specified into the master save data file. As is obvious to one skilled in the art, the kind of save data function is not limited to the example. A detailed, complex save data function may be developed to save, for example, predetermined portions of the data or to save data in a special format.

Figure 6B:
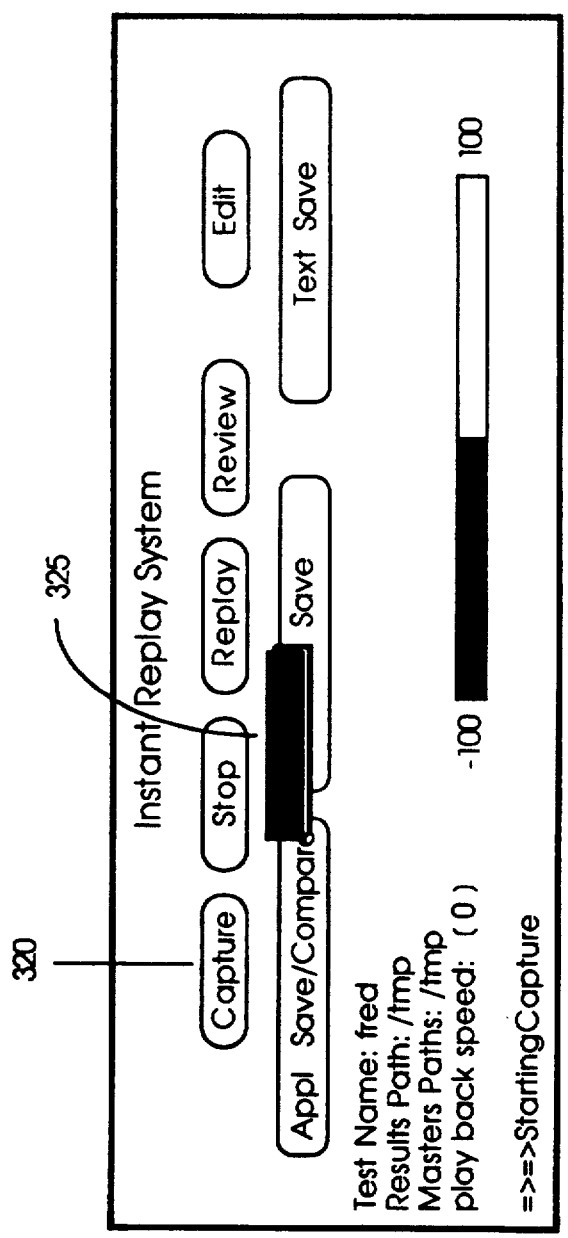

During specific times during capture, the user indicates to the testing system that a save data function is to be performed. The save data function can be tailored to save data types such as text, bit maps, or data in a special format, for example, data base structures or spreadsheets, which are stored in a binary format. Events indicative of the save data function are inserted into the journal file at the locations in the journal file where data is to be compared. The events may be specially created events which identify the save data function. However, it is preferred that the save data functions are available through menu items displayed and the events which enable the save data function are a series of events which reflect the movement of the cursor to the save data menu item and the selection of the save data menu item. The save data functions are accessible by the user of the testing system through menus provided to the user during the capture sequence. The user selects the menu and menu item for the particular type of data save that is to be performed. This is illustrated in FIG. 6b. The capture mode has been selected and initiated as is shown by the slightly darkened "capture" menu button 320. FIG. 6b further shows that the save data function "Spreadsheet" 325 has been selected. Optionally, the user will specify the file name or location where the save data is to be stored.

The journaling mechanism during capture will record as events the cursor movements and mouse functions that are implemented to select the menu item for the save data function spreadsheet. Thus, during replay of the journal file, the journaling module will output to the window system to be executed those same movements and functions thereby reselecting the menu item for the save data function and causing the save data function to be executed. In addition, as stated above, the data to be saved is input to the filter functions enabled before the data is saved for subsequent comparison.

Preferably, when a save data function is executed during replay, the compare module is automatically enabled, after the data has been saved, to compare the actual data, that is the data that has just been saved during the current execution of the application, to the master data which is the expected data. If the master data does not equal the actual data, differences are determined, the comparison fails, the test is given a failure status and a failure file is generated containing a copy of the actual data in wich differences were determined. As will be described below, the failure file is used to review the comparisons for analysis of the test. The comparison module comprises at least one comparison function, a comparison function modification means and a comparison function execution means. The comparison functions are user extendible and user definable for flexibility in testing. The comparison function may be one that compares two text files, one that compares two bit map images or one that compares an application specific type of data such as a database structure or spreadsheet. An example of a comparison function is illustrated in FIG. 7a. FIG. 7a is a simple comparison function which compares two text files. Using this function, the module reads the master file and data file and compares the files one byte at a time. If a difference is determined, the comparison is terminated and the failure status is noted. If no differences are determined, the save data is removed from the master data file and a pass status is noted. It should be realized that this comparison function is only exemplary and it is obvious to one skilled in the art from reading the present description that the comparison function can be developed to be a more complex, intricate and detailed comparison module. For example, the function may perform certain actions with respect to the failed data or the module may not terminate the comparison and continue to compare the master and actual text data. The comparison functions are preferably created in a high level programming language and subsequently compiled into executable code for subsequent execution by the comparison function execution means. The comparison function modification means is preferably a text editor but may be a modification means specifically developed to edit comparison function.

Preferably, a comparison function is created to compare a specific type of data saved, for example text as a spreadsheet. However, a comparison function may be used to compare data saved according to a variety of save data functions. For example, a binary bit comparison function may be used to compare data saved according to a save data function which saves spreadsheet data in a binary format as data base data saved in binary format. The same text comparison function may be used to compare a text file, such as text from a book, or data which is converted by a filter into a text format prior to being saved to a file by the save data function. Although a comparison function to execute may be selected from a menu of comparison functions, it is preferred that the comparison function is linked to a save data function such that when the save data function is executed, the comparison function is automatically executed after the linked save data function is executed. One way this may be achieved is by providing a list of save data functions and corresponding comparison functions which the testing system references to determine the comparison function to execute. The save data function and r comparison function pairs are preferably each identified by a unique name such that the user identifies the save data function and comparison function according to functions can be mixed and matched with each combination being identified by a unique name to achieve the testing functionality desired.

Figure 7C:
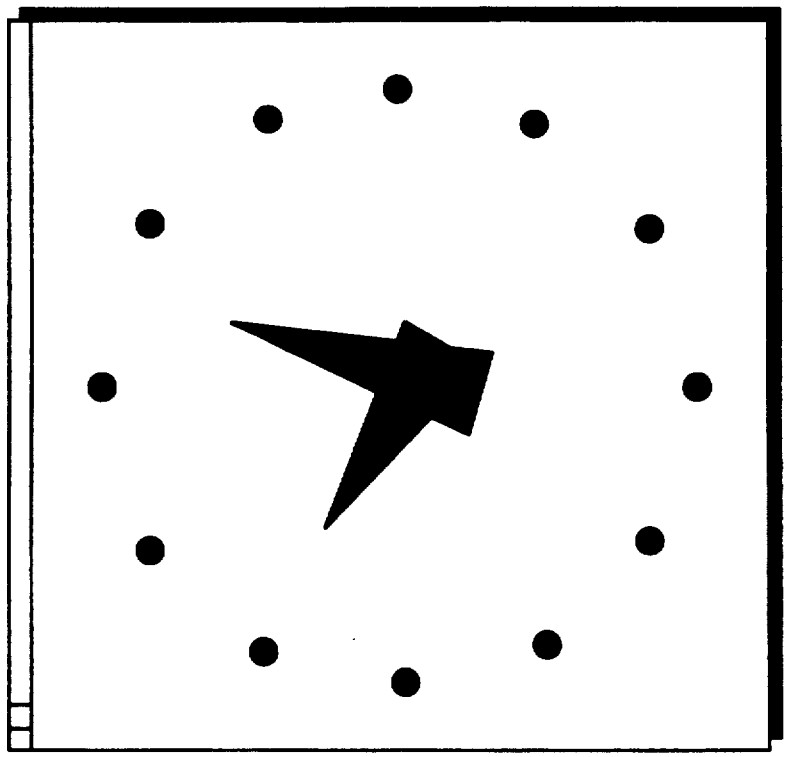
FIGS. 7b and 7c are illustrative of master data and actual data to be compared using a comparison function and FIG. 7d shows the differences between the data of FIGS. 7b and 7c.
Figure 7B:
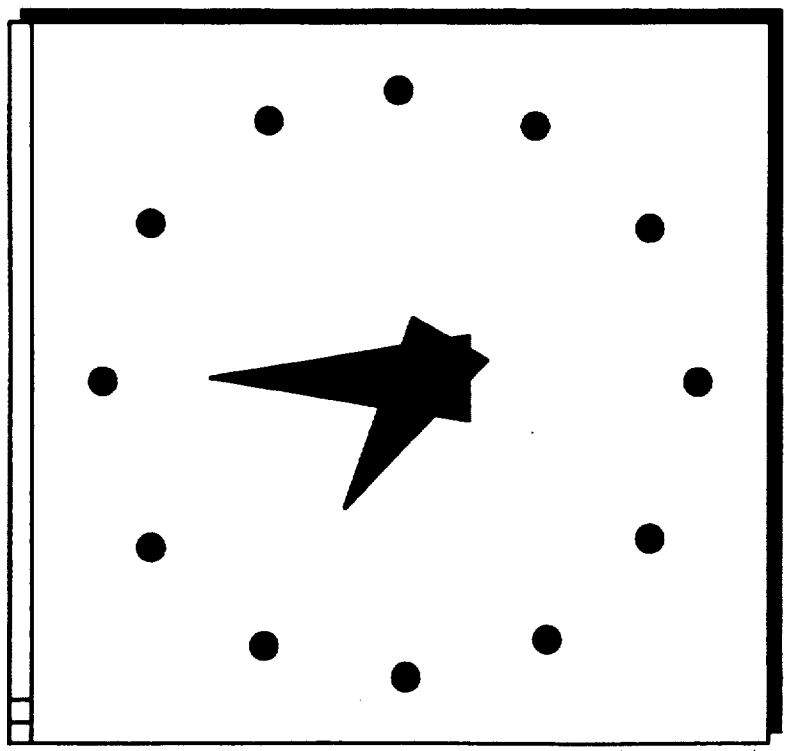
Figure 7D:
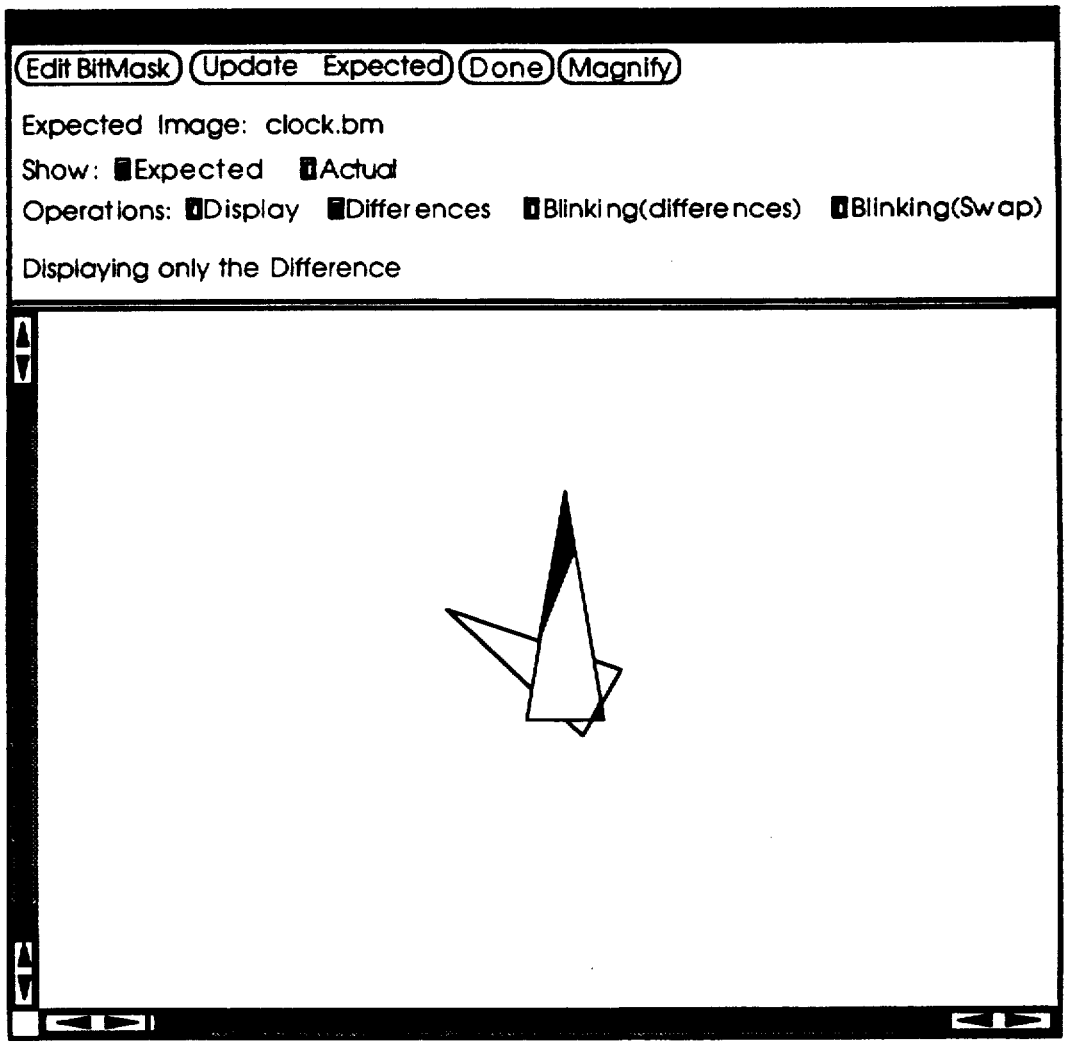

FIGS. 7b and 7c illustrate how a comparison is perfomed. FIG. 7b illustrates a bit map image which is identified as the master data. FIG. 7c illustrates the actual data save during a replay of the journal file. During execution of a comparison function which compares two bit map images, the differences identified will be noted (see FIG. 7d) and the data of FIG. 7c is written to a failure file for subsequent review and analysis.

Figure 20:
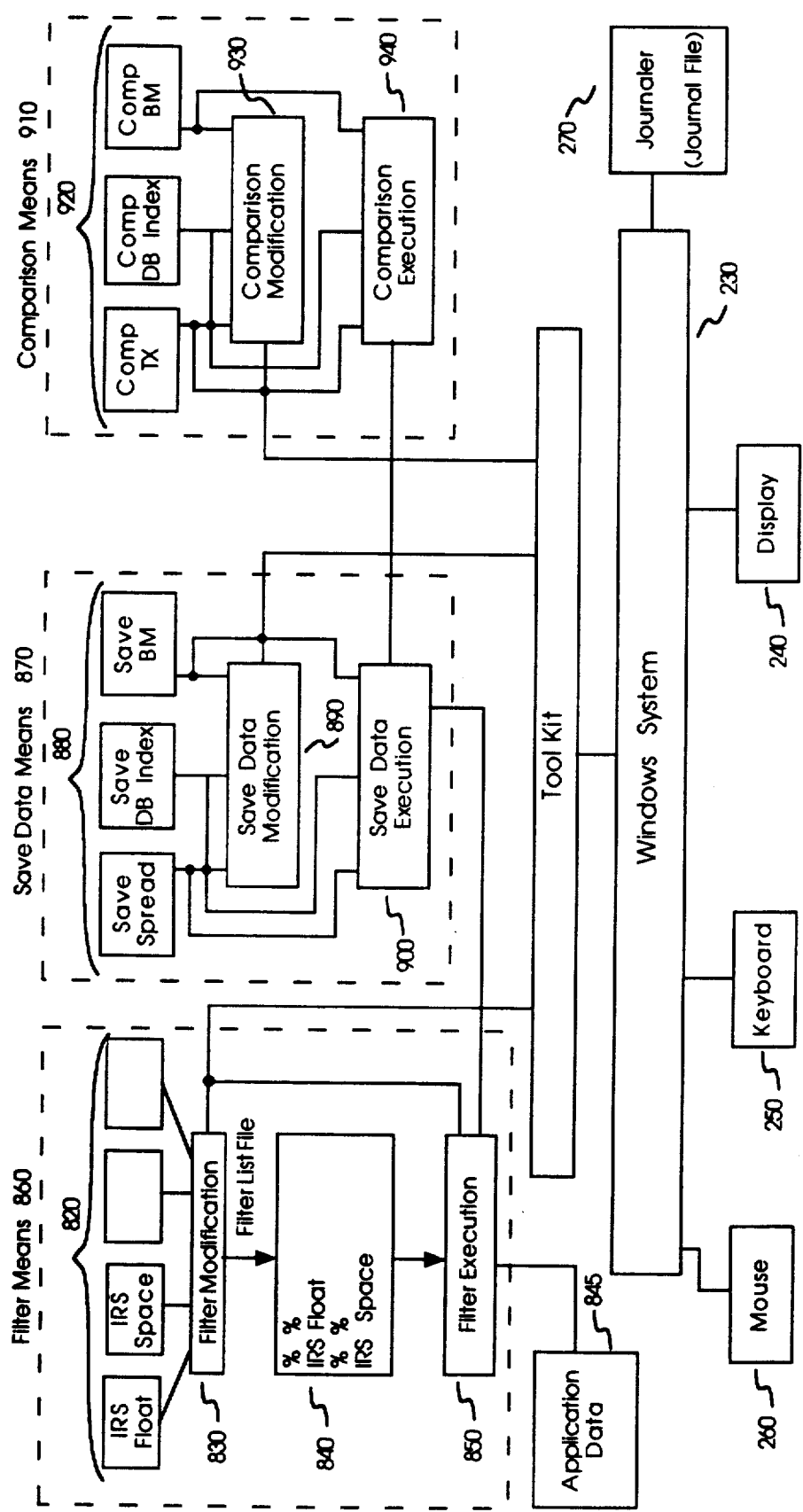
FIG. 20 illustrates the filter means, save data means and comparison means of the present invention.

Referring to FIG. 20, a block diagram of the filter, save data and comparison means is illustrated. As previously stated, filter means 860 comprises of: filter functions 820; filter modifications means 830; filter list file 840; and filter execution means 850. Filter modification means 830, which may be a text editor, is coupled through window systems 230 such that a user, through mouse 260 and keyboard 250, may change, add or delete filter functions to filter list file 840. As illustrated in FIG. 20, filter functions IRSfloat and IRSspece have been added to filter list file 840. By way of instruction by the user, additional filter functions may be added to filter list file 840, and any of the filter functions 820 may be edited to change the operation of the filter by filter modification means 830. Filter execution means 850, once enabled, causes filter functions 820 to be executed by the CPU.

Save data means 870 comprises of: save data functions 880; save data modification means 890; and save data execution means 900. Save data modification means 890 allows a user, through keyboard 250 and mouse 260, to add, delete and change save data functions 880. Although data save functions "save spread", "save bit map" and "save text" are shown, any number of save data functions could be added to save data functions 880 by save data modification means 890. Because save data modification means 890 may be a text editor, save data functions 870 may be modified. Once enabled, save data execution means 900 causes save data functions 880 to be executed by the computer.

Similarly, comparison means 910 comprises of: comparison functions 920; comparison modification means 930; and comparison execution means 940. Through comparison modification means 930; keyboard 250 and mouse 260, the user may add, delete, or modify comparison means functions 920. In this way, once comparison functions are enabled, comparison execution means 940 will cause the functions to be executed in the computer.

Figure 21:
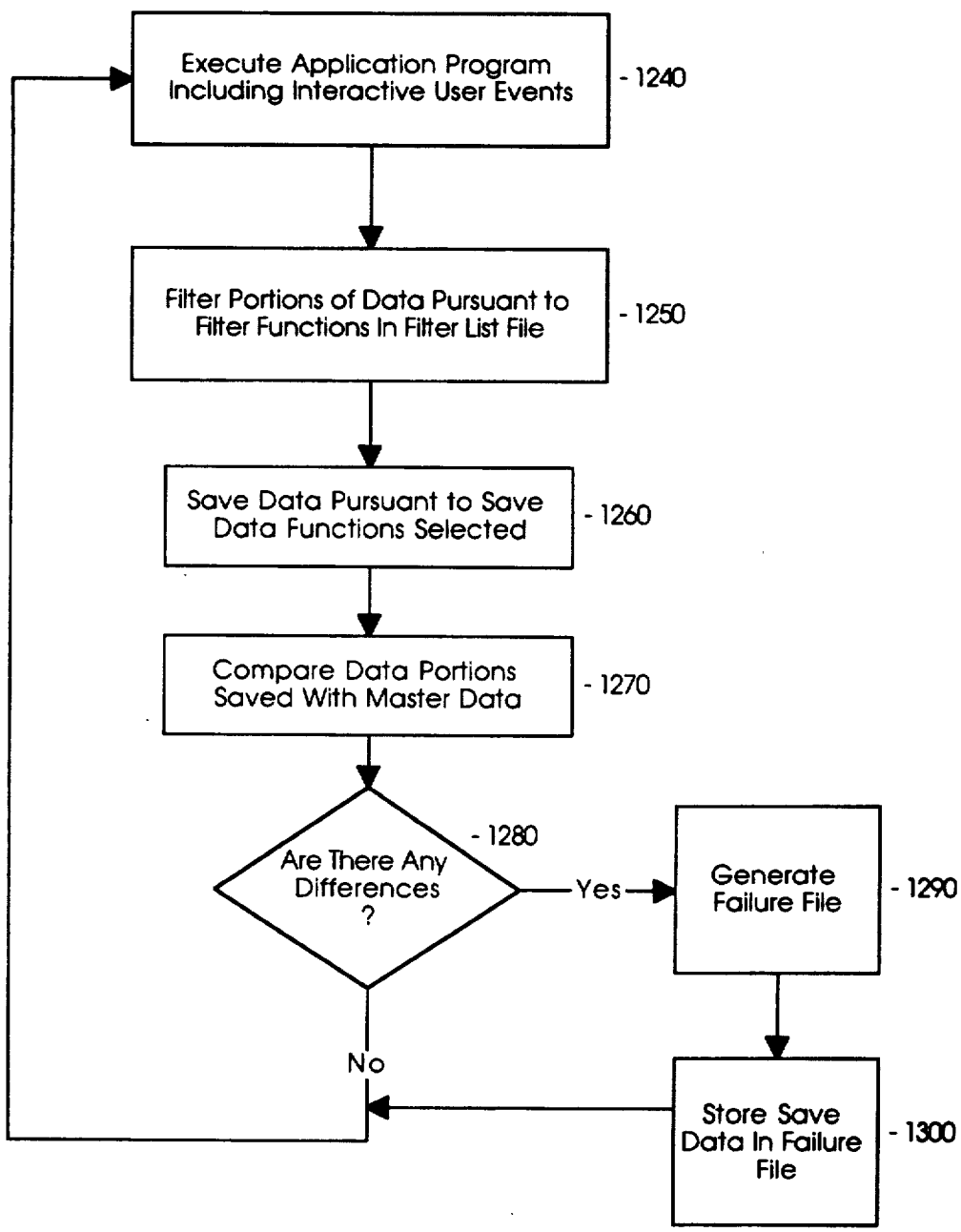
FIG. 21 is a flowchart illustrating the method of employing the filter, save data and comparison means of the present invention.

The method for the events perfomed in the journal file is illustrated in the flow chart of FIG. 21. In block 1240, the aplication program is executed including the interactive user events. The application program data are filtered at block 1250 pursuant to the filter functions located in the filter list file. This will remove portions of the data from the aplication program data. In block 1260, the filtered data is saved pursuant to the save data functions selected by the user. Similarly, in block 1270, the data saved pursuant to the save data functions are compared with the actual data by the compare data functions selected. In block 1280, if there are any differences, then a failure file will be generated and the data saved will be stored in the failure file as illustrated in blocks 1290 and 1300 respectively. Once the test has been run and the journal file has been replayed, the results of the test may be reviewed. The user extensible review module provides a tool with which the user can review the differences between master data and actual data of a failed comparison. The review module comprises at least one review function which specifies how the user is able to review and analyze the differences, a review function execution means and a review function modification means.

Also, the user can add review functions, delete review functions or modify review functions. Preferably the review functions are created using a text editing tool to generate a program in a high level programming language which is compiled into executable code for subsequent execution by the review function execution means. A simple review module is illustrated in FIG. 8a. The review module uses the UNIX module "diff" to prepare a list of differences of the two files and starts a shell window (i.e., a new window on the display) which runs a text editor to display the results of the diff function. When the text editor is terminated, the review module prompts the user to indicate whether or not to update the master data with the actual data. If the user answers affirmatively, the actual data is copied over to the saved data. The review function is tailored specifically to the type of data which was saved and compared. For example, if the data is text, the review module when executed may display the line of text from the master data and the corresponding line of text from the actual data at which a difference was detected. Alternatively, the review module may display the actual data with the text differences highlighted. Similarly if the data is a bit map image, the review function may generate a display of the actual data with the differences noted by a different color or by blinking the pixels on and off. As is apparent to one skilled in the art, the review module may be simple or complicated and detailed according to the requirements of the test. An example of data displayed according to a review function is shown in FIG. 8b. FIG. 8b illustrates a display generated by a text review module which notes the differences between floating point numbers. The master data is displayed on the left and the actual data is displayed on the right. The far left column notes, using the string "CHG", where differences were determined.

Figures 9A, 9B:
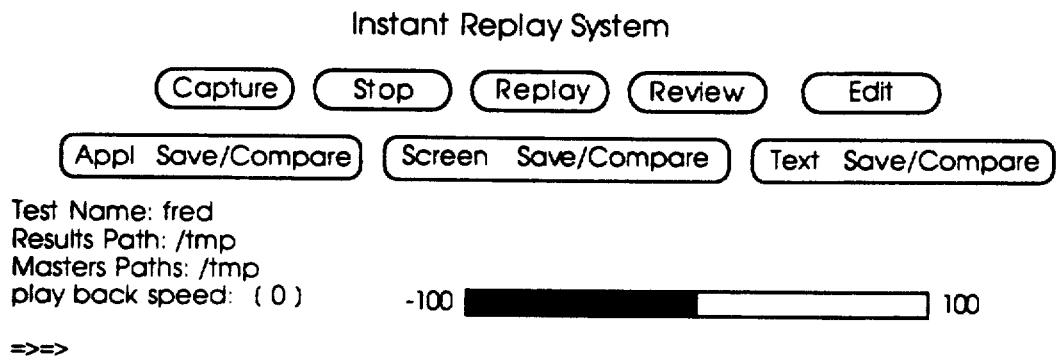
FIG. 9a is illustrative of the main menu of the preferred embodiment of the present invention and FIG. 9b is illustrative of the review module menu.
Figure 10A:
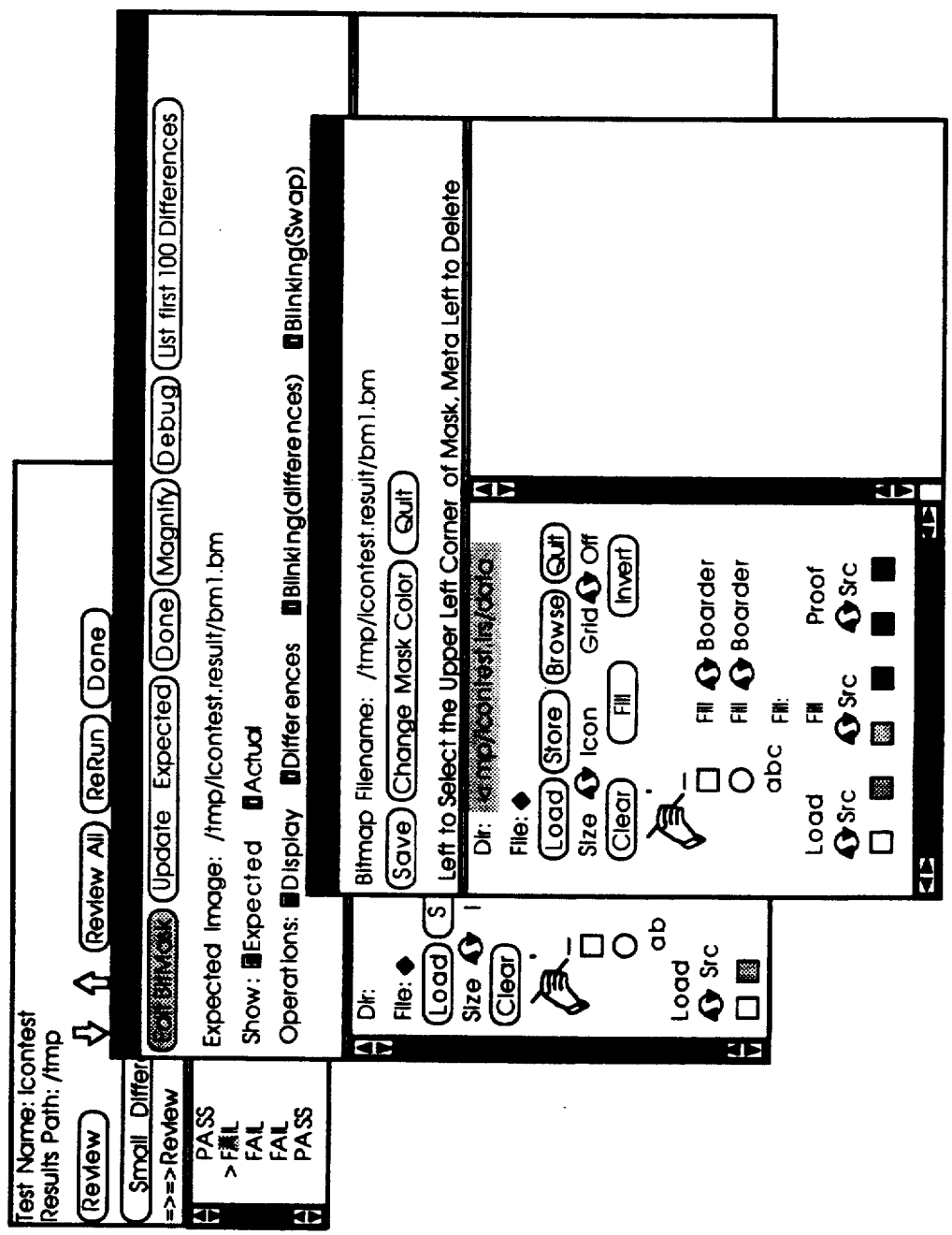
FIG. 10a illustrates the menus employed to provide the user the ability to define bitmasks.

Preferably the review module is selected through a menu item which is part of the main menu (FIG. 9a) to bring up the review module menu (FIG. 9b). By using the review module, the user can review and analyze the test results to determine the changes to be made to the application or system being tested to correct the errors which caused the differences. An additional feature provided in the user extensible testing system of the present invention is the users ability to eliminate or mask out data that represent differences in the actual data. The user may decide after the review of the differences that some of the differences do not reflect the pass or failure status of a test and would like to mask out those differences such that those differences masked will not cause a test failure status when the test is replayed. The user may also desire to mask out differences while debugging an application to eliminate some differences while debugging others. An example where the user ability to define masks may be desirable is illustrated by FIG. 10a. FIG. 10a is illustrative of a display showing three windows. The first window 400 is the review module menu. The user has selected the first failed compared (as noted by the ">" symbol 410) and examine screens menu function 420 to execute the review module for the comparison. The menu identifies the master data 430 and provides the user the option to display the master or actual data as well as a variety of options 440, 450, 460 to display the differences.

In the present illustration the master data is displayed. The user has determined that the field in the image "Dir", 470 has caused a difference to be determined. The field "Dir" identifies the directory the working directory, where the tests are executed. The directory may change for reasons unrelated to the pass or failure status of a test such as a different user running the test from his local directory. In order to avoid a failure status due to a change of working directory, the "Dir" field is masked. To create a mask, the coordinates of the outline of the mask is communicated to the review module. For example, the user can use the mouse and pointer to select the region by clicking on the upper left and lower right corners of the area to be masked. Preferably the review module responds by highlighting the masked area 480. The mask information is stored in the same file as the master data. An example of the mask data stored is illustrated by FIG. 10b. When the test is replayed and a comparison is performed, the compare module reviews the master data file and first determines if any masks exist for the present comparison. The comparison module will then eliminate from the comparison any portions of data defined by the masks.

The review module may be created to provide a single feature such as review of the differences or may be created to provide a variety of features as is shown in the review module menu of FIG. 10a. Another feature which is preferably included with in the review module is the "update expected" feature. Selection of this menu item will cause the master data to be replaced with the actual data. This may be desirable when the master data is no longer current because of data or system changes and the actual data is the correct data to be compared.

Another feature which provides additional functionality to the testing system of the present invention is the "Small Differences" feature. This is reflected as a menu item 490 in the review module shown in FIG. 11a. Sometimes small differences may be generated between tests which are not critical to the pass/fail status of the test or which the user wishes to defer until a subsequent replay of the test. Using the small differences feature, the user can set tolerances for differences. If the difference is within the tolerance a small difference is noted. The tolerances can be provided as parameters to the test system during replay. Alternatively, the tolerances can be applied during review of failed comparisons. The tolerances may also be stored in a separate file for reference. FIGS. 11a-11f illustrate this feature with respect to bit maps although tolerances can be created for other types of data.

Figure 11A:
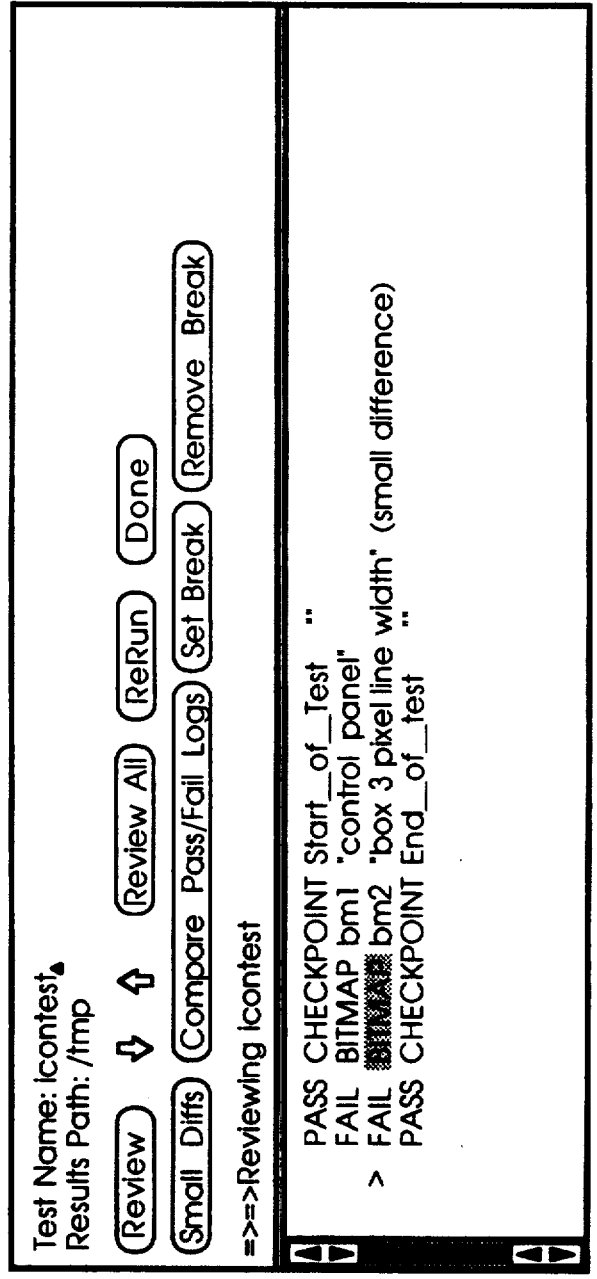
Figure 11B:
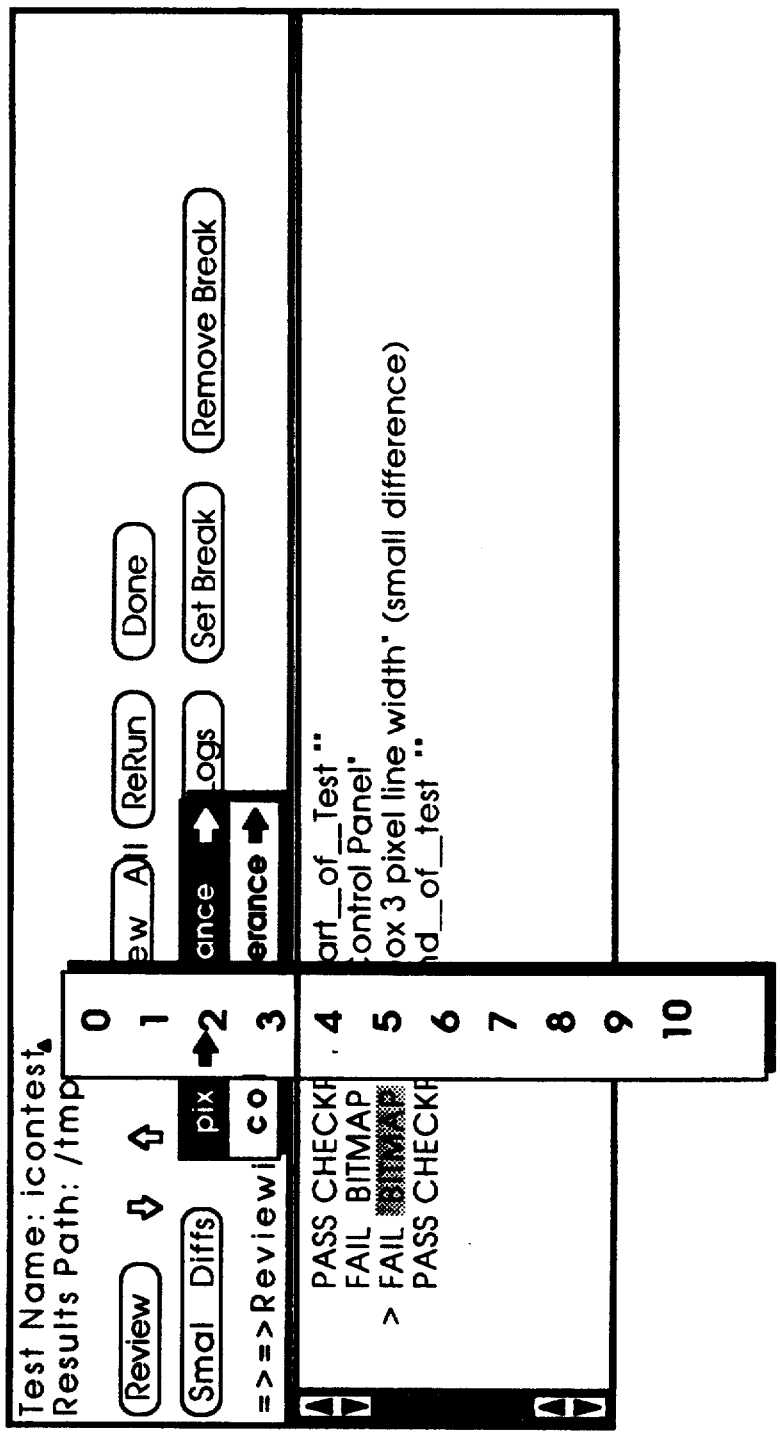
Figure 11C:
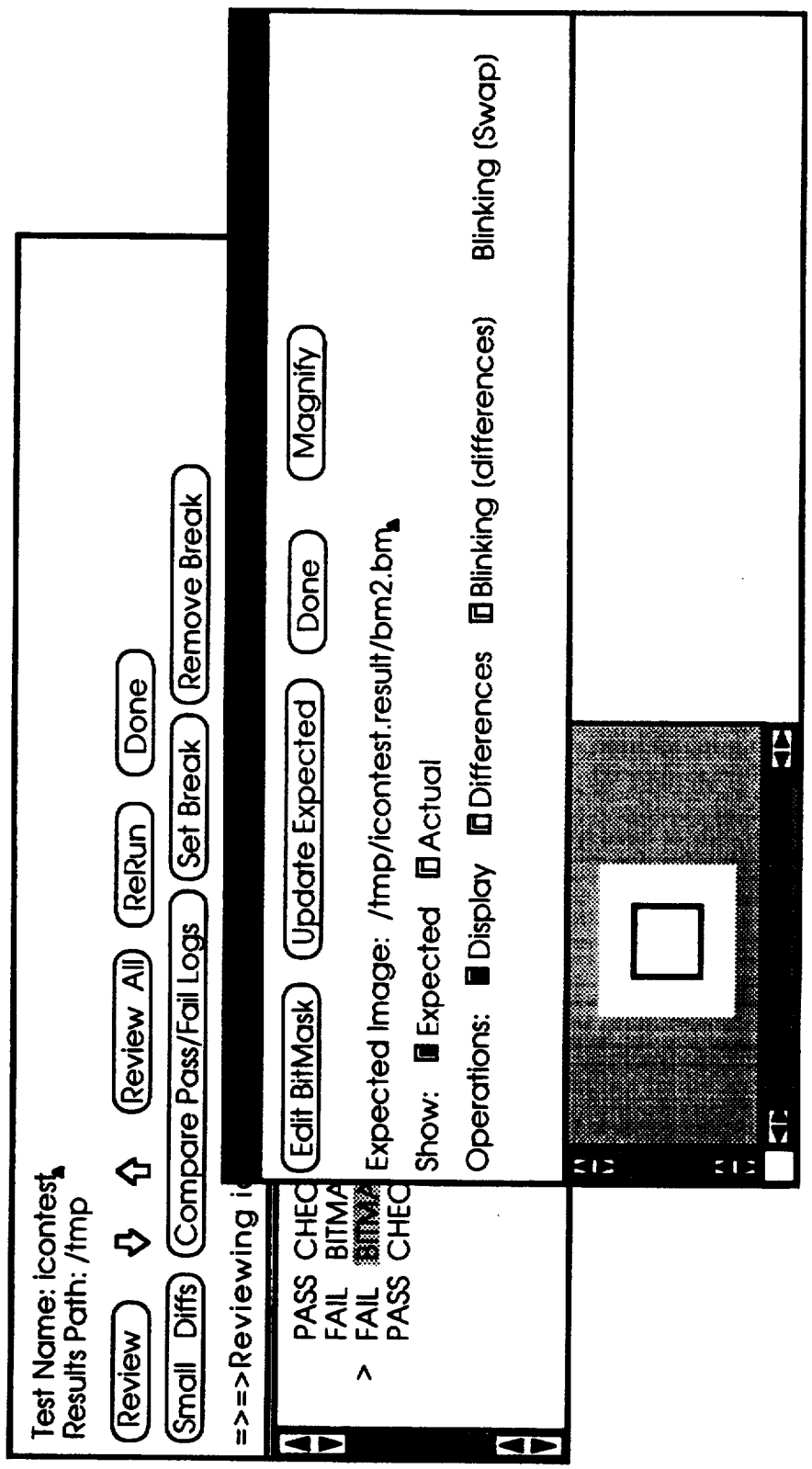
Figure 11D:
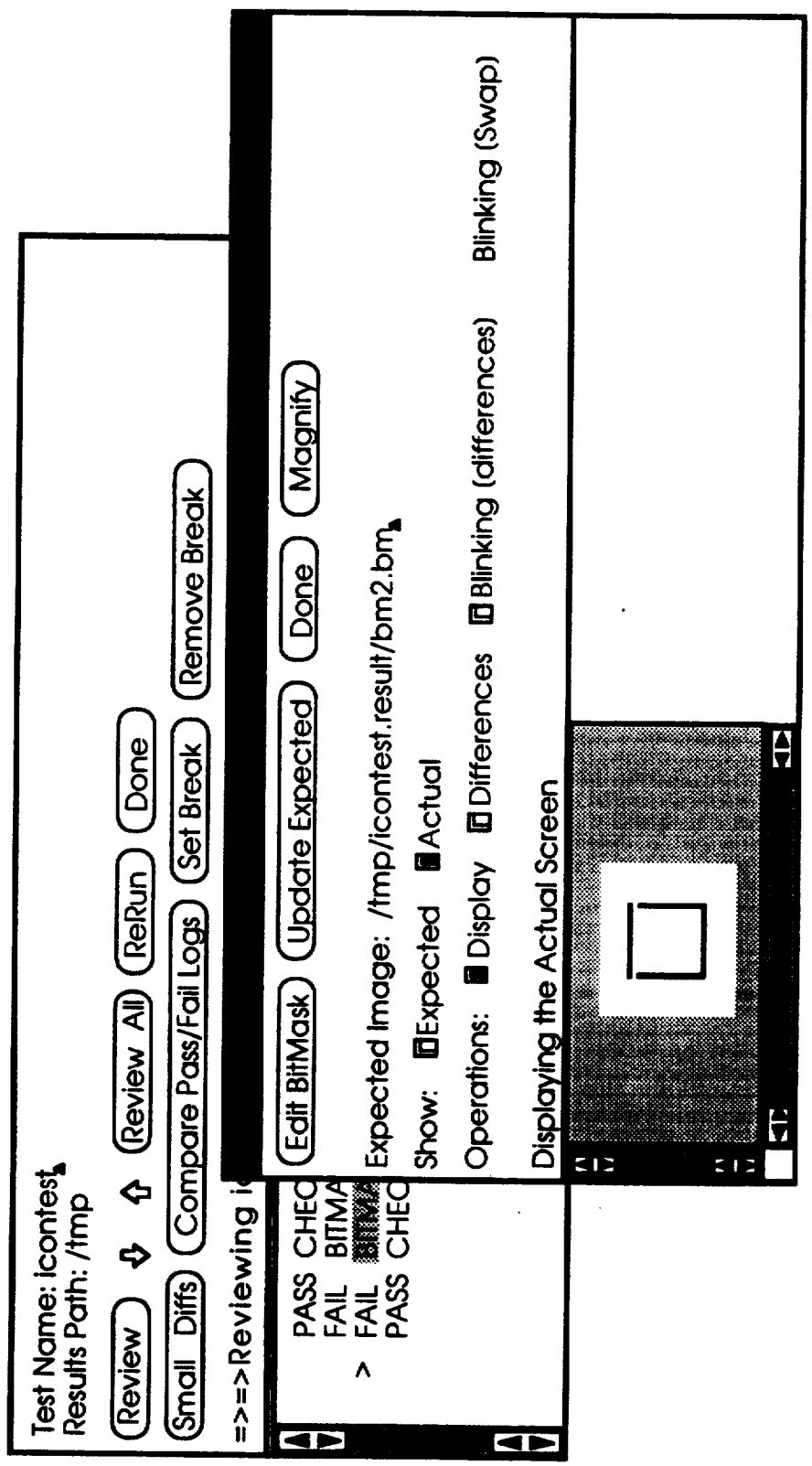
Figure 11E:
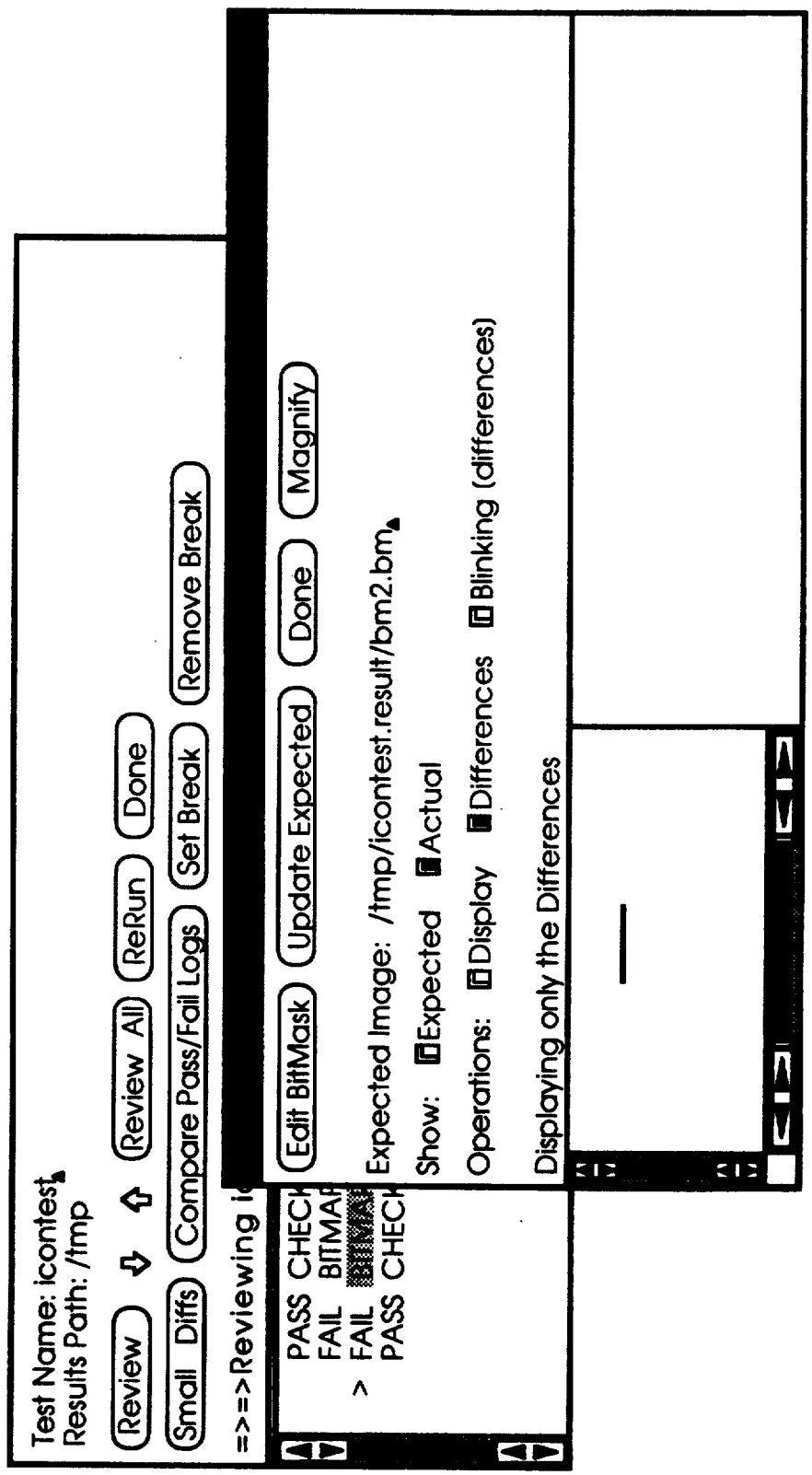

FIG. 11a shows the review module menu and the test log of results. The test was run with the small differences feature enabled. The first comparison, "bm1", which used the comparison module "BIT MAP" passed. The second comparison, "bm2", which compared a box 3 pixels in width, failed. A small difference was noted indicating that the differnce is slight and within the tolerance set by the user (FIG. 11b) illustrates the setting of a pixel shift tolerance. FIG. 11b shows the selection of the "small difference" menu item and the sub-menu item "distance". This displays a menu of numbers representative of the number of pixel locations a pixel can be shifted and still be noted as a small difference. Thus, if a pixel shift is only 1-3 pixels, a small difference is noted. FIG. 11c shows the review panel in which the master data is displayed. Examination of FIG. 11d shows that actual data on the top line of the box has been shifted up a few pixels, and FIG. 11e shows only the differences noted between the master data and actual data.

The testing system can include other tolerances, such as numeric tolerances, according to the application tested. For example, FIG. 11f shows the selection of the "color tolerance" sub-menu item which displays the color tolerance.

Figure 22:
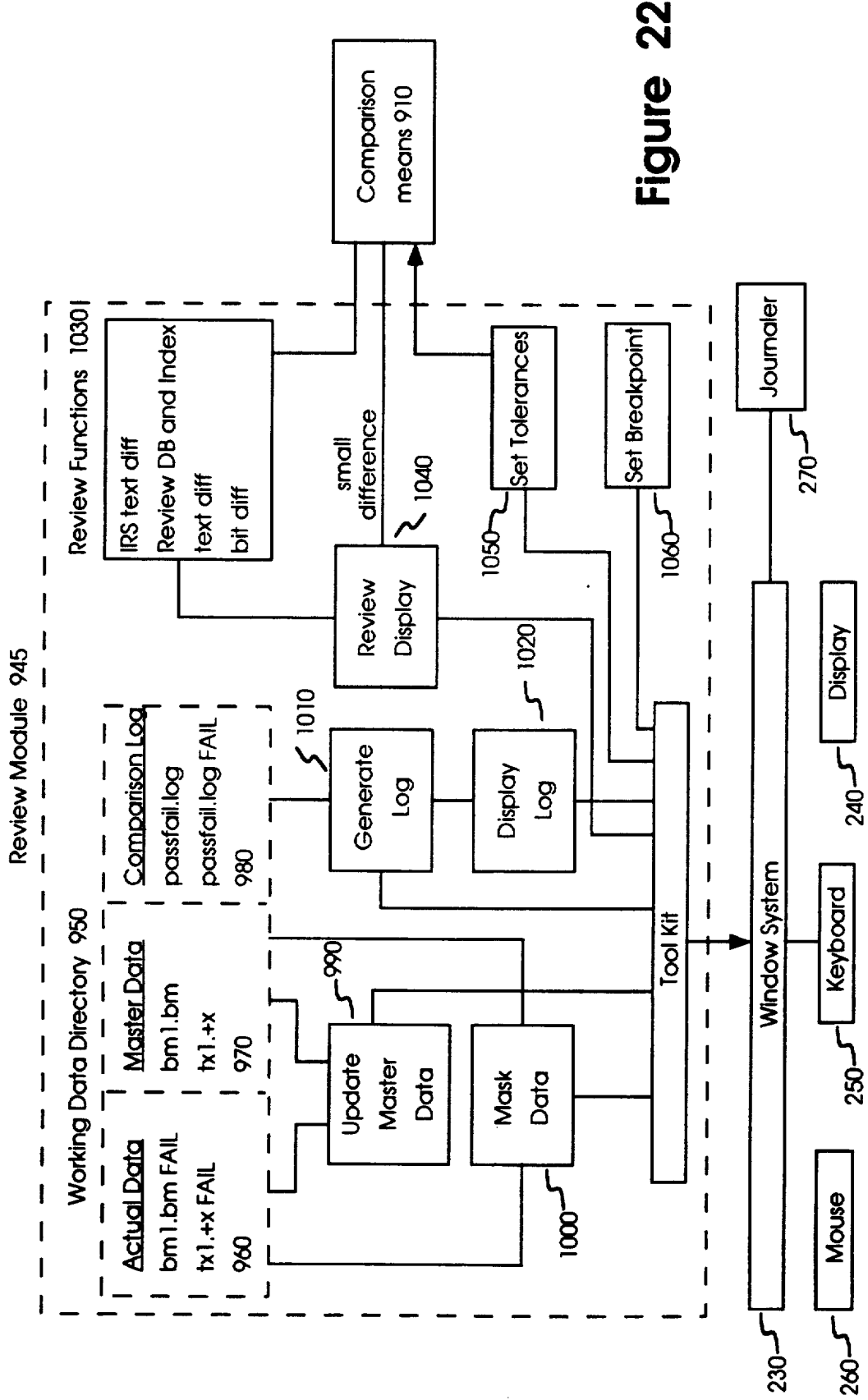
FIG. 22 illustrates the review module of the present invention.

Referring to FIG. 22, the review module of the present invention is illustrated. The working directory, which contains actual data, master data and the comparison log, is accessible by the review module. Once the data is compared by comparison means 910, review functions 1030 may review the data in a variety of ways. Review display 1040 displays the data according to the review function selected. Review module 945 comprises set tolerances means 1050 and set breakpoint means 1060. Set breakpoint means 1060 causes the journal file in journaler 270 to pause relay of the events. Set tolerance means 1050, which is connected to comparison means 910 as well as window system 230, allows the user to specify a particular tolerance when the actual data and the master data are compared. If the comparison falls within the tolerance specified, then comparison means 910 indicates the "small differences" to review display 1040 and review functions 1030.

Still referring to FIG. 22, review module 945 comprises of generate and display log 1010 and 1020 respectively, which generates a comparison log of each comparison performed and indicates whether the comparison passed or failed. Review module 945 also has the ability to mask specified data in mask data means 1000 such that the masked data in the actual data is not compared to the corresponding master data. Update master data 990 provides the user the ability to update the master data with the actual data.

Figure 23:
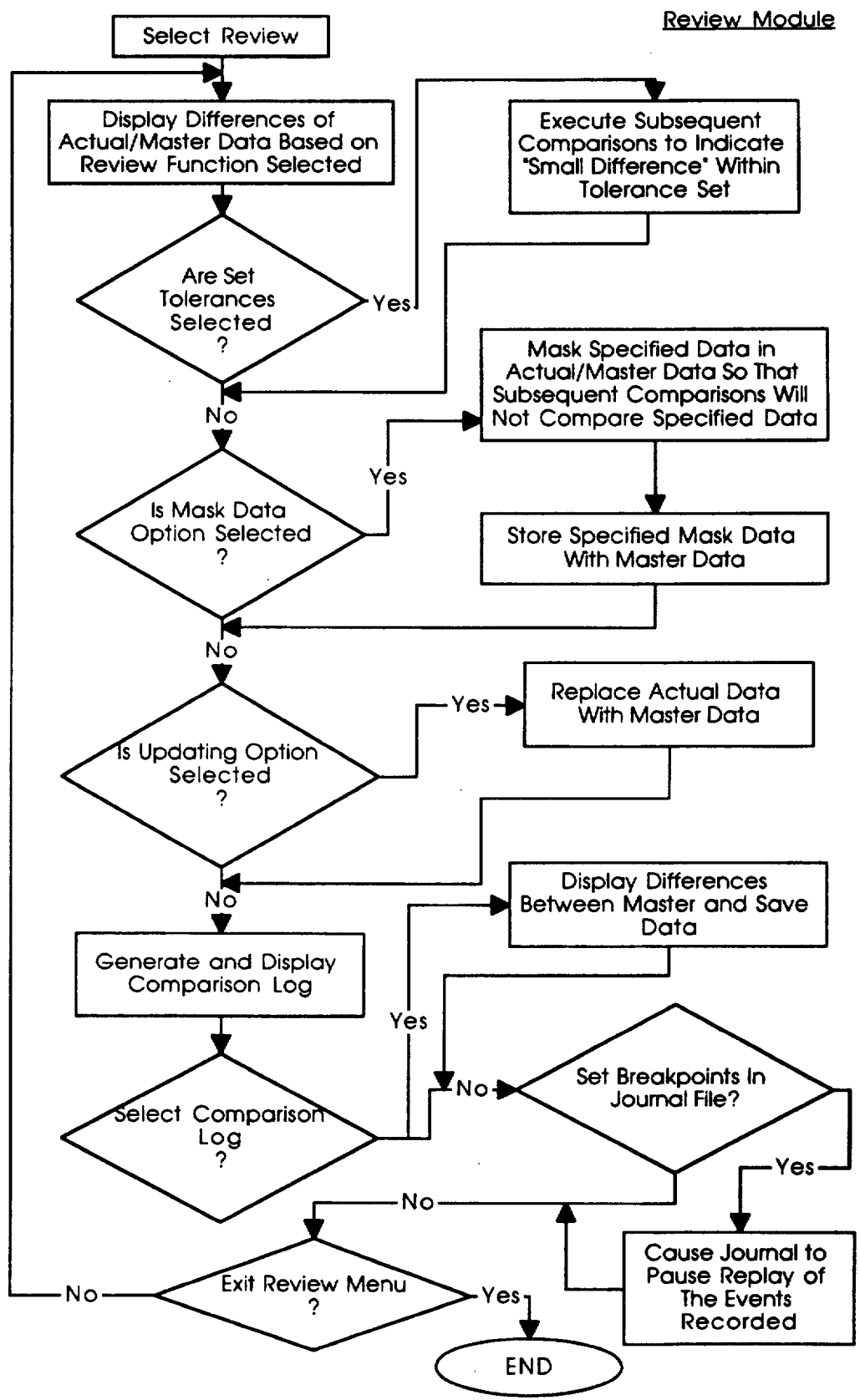
FIG. 23 is a flowchart illustrating the method of the review module.

In FIG. 23, the method for the review of the present invention is illustrated. In block 1320, the differences between the actual and master data are displayed. If tolerances are set, then subsequent executions of the comparison functions will indicate "small differences" if the data generated is within the set tolerance. In block 1360, it is determined whether the mask data option is selected. If it is, then block 1350 is executed which masks specified data such that subsequent comparisons will not consider the portion of the data masked. This information is stored within the master data. If the updating option is selected as in block 1380, then block 1390 is executed which will replace actual data with master data. In block 1400, the comparison logs will be generated for which the user may select. If the user selects a comparison log block 1410, then block 1420 will be executed thereby displaying differences between master and save data. In block 1430, the user may select the set breakpoints option which will cause the journal to pause replay of the events recorded. At any time, the user may exit the menu as in block 1450.

The flexibility of each module as well as the system as a whole provides a user extensible testing system which can be tailored to a specific test. In the preferred embodiment, each function in each module is identified by a unique name for easy reference. A file (referred to herein as the IrsApplication file) is created which lists each combination of functions, referred to as a save/compare/review sequence, comprising a save data function, the corresponding comparison function and review function and identifies each save/compare/review sequence by a unique name. Typically a save data function will always utilize the same comparison function and review function. However, the system is not limited as such and multiple combinations of save data, compare and review modules can be established by uniquely identifying each combination in the function file. An illustration of the contents of the file is shown in FIG. 12.

FIG. 12 shows the contents of an illustrative IrsApplication file. This file includes four save/compare/review sequences including one save/compare/review sequence named "SPREADSHEET". This name is referenced by the testing system and displayed as one of the testing system menu options. The testing system references the IrsApplication file at startup of the system and is used by the system to generate the testing system menu options. For example, the toolkit in the SunView window system is used to create menu items associated with the buttons of the main menu (For further information on the SunView toolkit, see *SunView TM 1 Programmer's Guide*, Chapter 12, "Menus"

(May, 1988). The SPREADSHEET save/compare/review sequence includes the save data function "save spread", the comparison function "IRScompTX" and the review function "IRStextdiff". The data application also includes the file name suffix or extension used to identify those files of data saved and compared using this data application. For example, all master and actual data files generated according to this data application are identified by the file extension ".wk.".

The save data function "save spread" reads a spreadsheet, which is represented in the application in a binary format, converts the binary format into ASCII format and stores the ASCII data in a data file for comparison to the master data. The comparison function, IRScompTX is a general text comparison function and the review module IRStextdiff displays text differences in an easy-to-review graphical format.

Alternatively, because of the flexibility of the testing system of the present invention, the user can create a second save/compare/review sequence for comparing spreadsheets which may utilize a different save data function and/or different comparison function and/or different review function. For example, the user can create a data application "SPREADSHEET2" which uses a save data function "save binary", which saves the spreadsheet in binary format, a comparison function "comp binary", which compares two binary files, and a review function "binary diff" which displays the differences between binary files in a graphical format. Therefore by creating the save data, compare and review functions and identifying the combination of functions for a particular data type in the IrsApplication file, the user has the flexibility to save, compare and review any type of data.

Figure 13A:
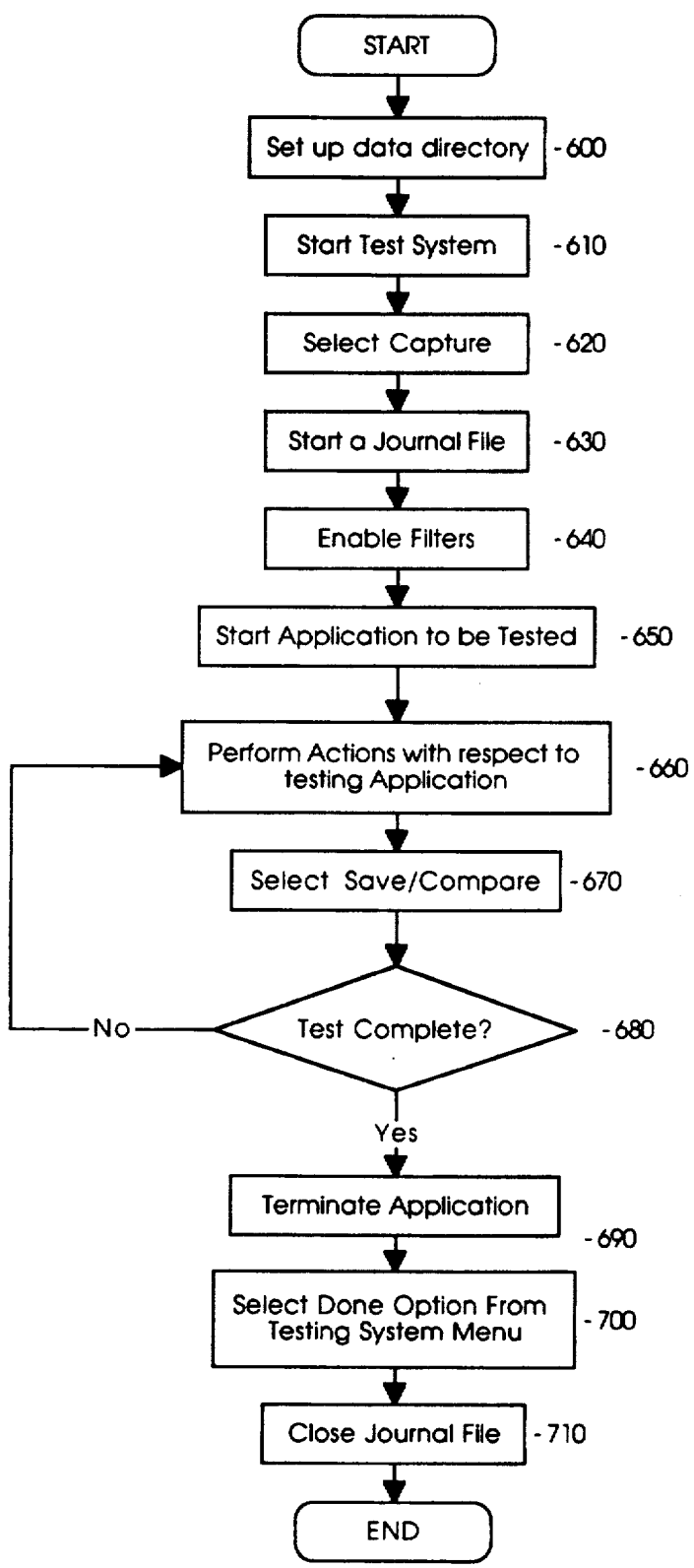
FIGS. 13a and 13b are flowcharts which illustrate the process for setting up a test and executing a test using the user extensible testing system of the present invention.
Figure 13B:
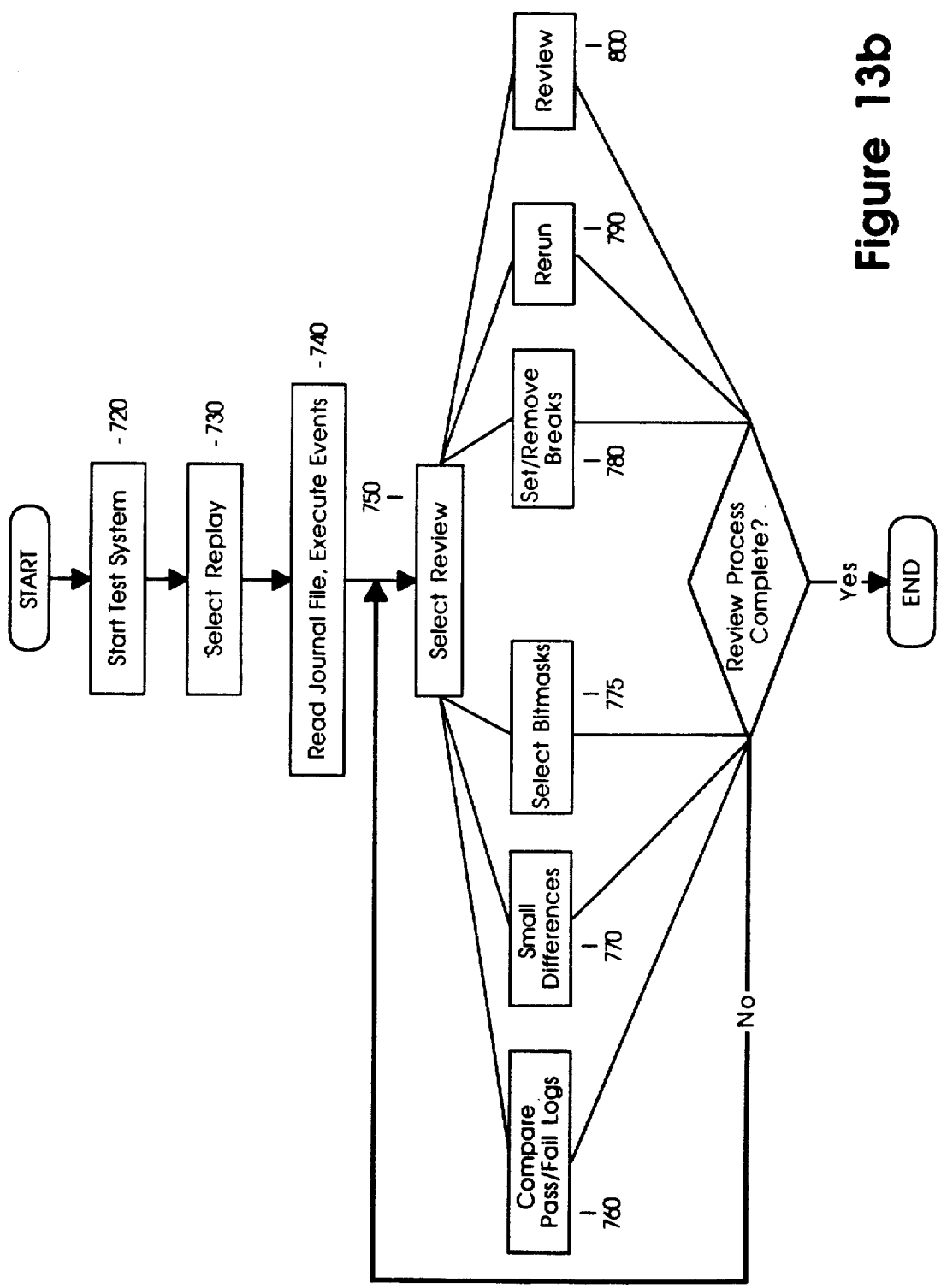

The process for setting up a test and executing the test is illustrated by the flowcharts of FIGS. 13a and 13b. To set up a test, a data directory is established in which the files relevant to the test are placed (block 600). FIG. 14a shows a listing of files in a data directory prior to capture and creation of the journal file and the master data. The data directory, "sample data" contains application specific information which is used by the testing system. The data directory may contain the save/compare/review sequence which may be used (IrsApplications), the file of filters that are available (IrsFilters) and data relevant to the execution application to be tested. The file "traffic.icon" is application specific data. Traffic.icon contains icon data which is manipulated by the application that is tested through the testing system of the present invention (because the application tested is an icon editing program). The user may also put in the file application programs to be used during the testing system operation. For example, as illustrated in FIG. 14a, the file "floating prog*" is located in the data directory sample data and is an application program which creates an output of text containing floating point numbers.

Figure 15A:
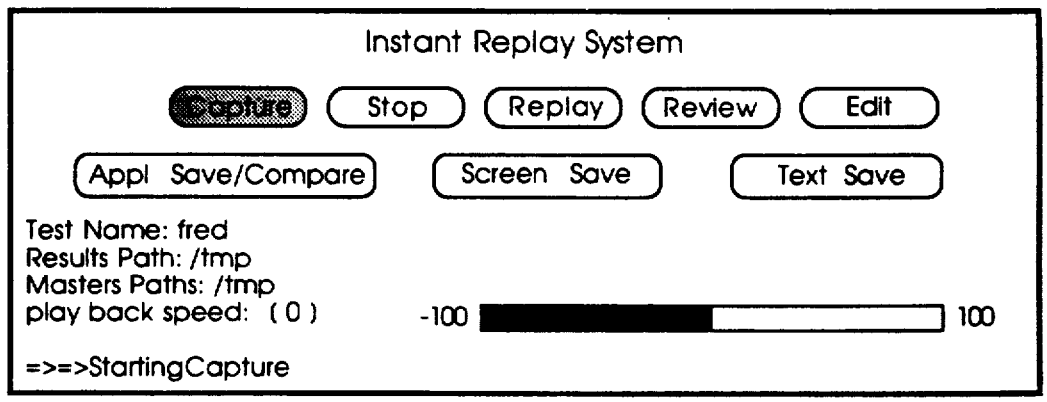
FIG. 15a illustrates the main menu of options of the present invention.
Figure 15B:
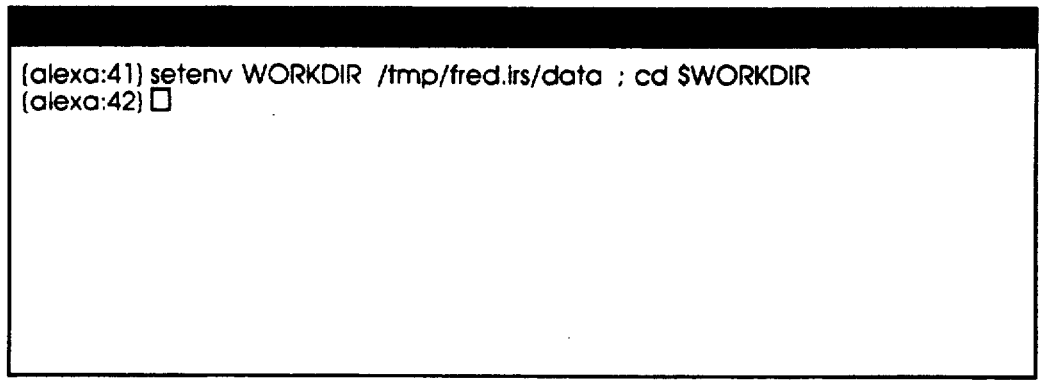
FIG. 15b illustrates the work space in the testing system of the present invention.

Referring back to FIG. 13a, at block 610, the testing system is initiated. At that time, the testing system menu of available options as well as a second window containing the work space of the system is displayed to the user (See FIGS. 15a-15b). The work space is used to initiate the application that is to be tested or perform operating commands that are needed in conjunction with testing. The menu options available in the present illustration are Capture, Stop, Replay, Review and Edit. To generate a journal file, at block 620, the Capture menu item is selected which indicates to the system to start a journal file, block 630, of events reflective of user actions taken during the test. Once the Capture mode is on and the system is recording all user actions, the user can proceed to initiate the application to be tested, block 650, and perform various tasks with respect to the application, block 660, as well as perform comparisons of data, block 670, during the execution of various tests. Preferably, at block 640, filters are enabled to perform filtering in conjunction with the execution of the Save Data Module.

At block 650 the application to be tested is initiated by changing the input focus to the work space and keying in the command to start the application. At block 660 user actions are performed with respect to the testing applications. These actions are recorded as events and are stored in the journal file. These actions may be a simple movement of the cursor, a selection of a menu item within the application, the execution of a certain task or the keying in of information. The actions taken by the user to select filters and start the application have also been recorded in the journal file in the sequence performed. At any point during the performance of user actions, the user, at block 670, can change the input focus to the testing system window and select a save data and compare function to be executed from the menu of options (See FIG. 6b). When the capture mode is enabled, the journaling module captures the events reflective of moving the cursor to the testing system window, changing the input focus to that window and showing a selection of an object located at the particular location within the window to be recorded, which in the present illustration would be the comparison menu item. Thus, during replay, those same events will be executed causing the same sequence of actions to occur including the comparison selected.

Preferably, the master data is generated during Capture, whereby after selection of the comparison to be performed, the data is saved and identified as the master data for the comparison. At block 680, the user may complete the test by terminating the application being tested, block 690, and selecting the Stop menu item from the testing system menu, block 700, which then causes the journal file to be closed, block 710.

FIG. 14b shows the contents of the test directory "Sample.irs" after capture of a test. Each comparison performed is identified by the comparison extension provided in the IrsApplication file. For example, for a bit map compare, the files are identified by the extension "bm". Each comparison is further identified by a prefix containing a number indicating the number of samples or comparisons performed for the particular save/compare/review sequence. For example, FIG. 14b shows two bit map comparisons, bm1.bm and bm2.bm, indicating that bm1.bm was the first bit map comparison performed and bm2.bm was the second bit map comparison performed. Similarly, tx1.tx indicates that there was one comparison performed identified by the extension tx. The Session.log file is the journal file containing the listing of events performed during capture. During Relay, this file is read by the journaling module and output to the window system for execution in the sequence recorded thereby replaying the identical testing sequence performed during Capture. The file tx1.fltrs is a list of filters that are implemented for a save data function. The file time.log is a time log of events which provides the user additional insight into the execution of the test. Referring to FIG. 14c, the time log shows that the system required 149 seconds to get to the event where the text save data and comparison, tx1, was performed. The log also indicates by the string "COMPARE 2" that the tx1 comparison required 2 seconds to execute. Similarly, the system required 39 seconds to get to the next comparison performed, bm1, and the save data and comparison bm1 required 5 seconds to execute.

The file pass/fail.log is a file containing the status of the test, that is, the pass/fail status of each data comparison. During Capture, the data saved is the master data and no data exists to be compared to; thus all comparisons default to a pass status. Referring to FIG. 14d, the pass/fail log shows that the test passed through all checkpoints and data comparisons. A checkpoint is a milestone in the test whereby specific locations in the test are noted and can be used to acquire status information about the test. Preferably the start and end of the tests are identified as checkpoints. In addition, checkpoints can be inserted within a test using a predetermined button within the menu to identify the locations of the checkpoints. The version file is used to identify the version of the testing system which was used to generate the master files. The version file is utilized in order to avoid any unforeseen problems that may arise due to the testing system version used to generate the master data being a different version than that used to replay the test. An illustration of the version file is shown in FIG. 14e.

The available options shown after Capture are illustrated by the flowchart of FIG. 13b. The testing system once enabled, block 720, brings up the main menu of options (See FIG. 15a) and a work space through which system commands may be entered (See FIGS. 15a-15b). The user may then select the replay menu item, Block 730, which will cause the testing system to read the session log and output the events to the window system to execute the events sequentially listed in the session log, block 740, thereby duplicating the test earlier performed. When the testing system issues an event which causes a save data and comparison to be performed, the testing system will save the data indicated, compare it to the master data located in the data directory and generate a failure file of the data if the data comparison fails. If the data comparison passes, the data is not retained inasmuch as it is reflected in the master data. The execution sequence then continues, executing the events reflecting user actions and performing comparisons where indicated until the final event which selects the Stop function in the testing system window occurs. This stops the Replay sequence.

In the working directory, that is the directory from which the testing system is initiated and the test is executed, the following files are created as shown in FIG. 14f. The directory sample result contains a copy of the pass/fail log stored in the directory sample.irs as well as the pass/fail log for the current replay of the test. Both pass/fail logs are provided for the option to compare pass/fail logs to determine where differences exist between the two logs. This feature is useful for long tests with many comparisons. The directory further includes a copy of the master data and the actual data for each comparison which failed. For example, referring to FIG. 14f, a failure occurred with respect to two comparisons. Therefore a failure file bm1.bm.FAIL and tx1.tx.FAIL were generated for the failed comparisons. A copy of each master data file is also included for subsequent use by the review module. The result directory also contains a copy of the data used by the application. This data has been accessed by the application and may not be identical to the original data. Therefore, in order to eliminate errors which may occur from using different application data, the data is not reused to re-execute the test. To protect against such errors arising, when the test is initiated, a copy of the data file from the data directory is copied into the results directory and the application references the data in the results directory, thus preserving the original contents of the data in the data directory for subsequent test execution.

Figure 17A:
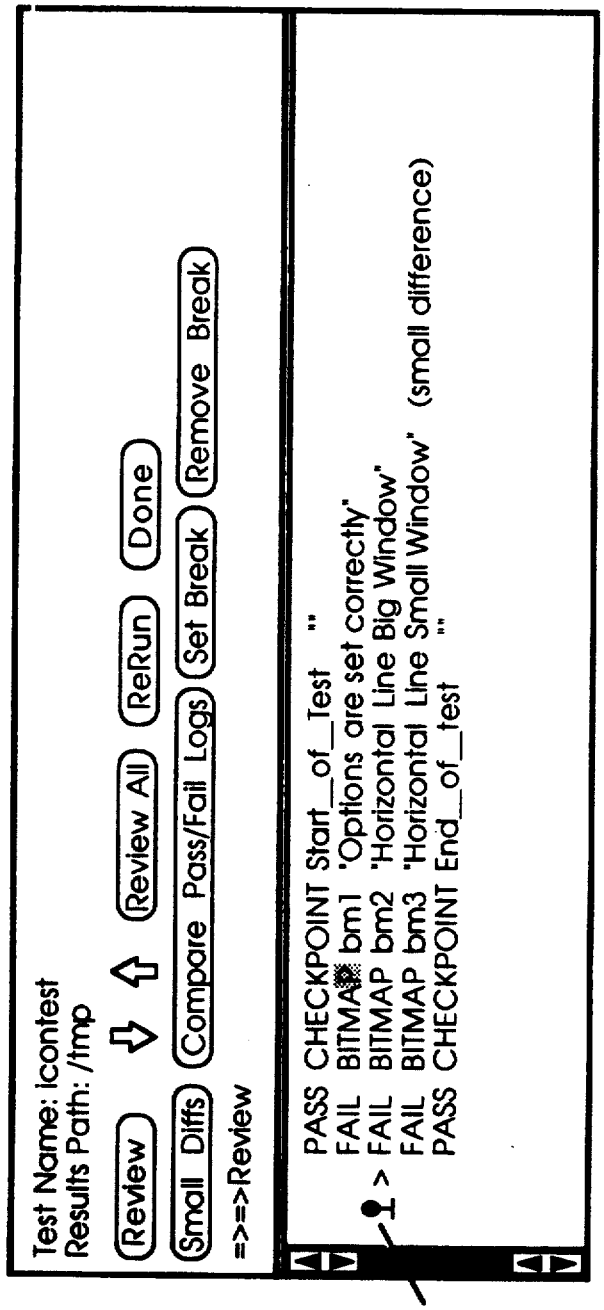
FIGS. 17a and 17b illustrate the execution of breakpoints in the preferred embodiment of the testing system of the present invention.
Figure 17B:
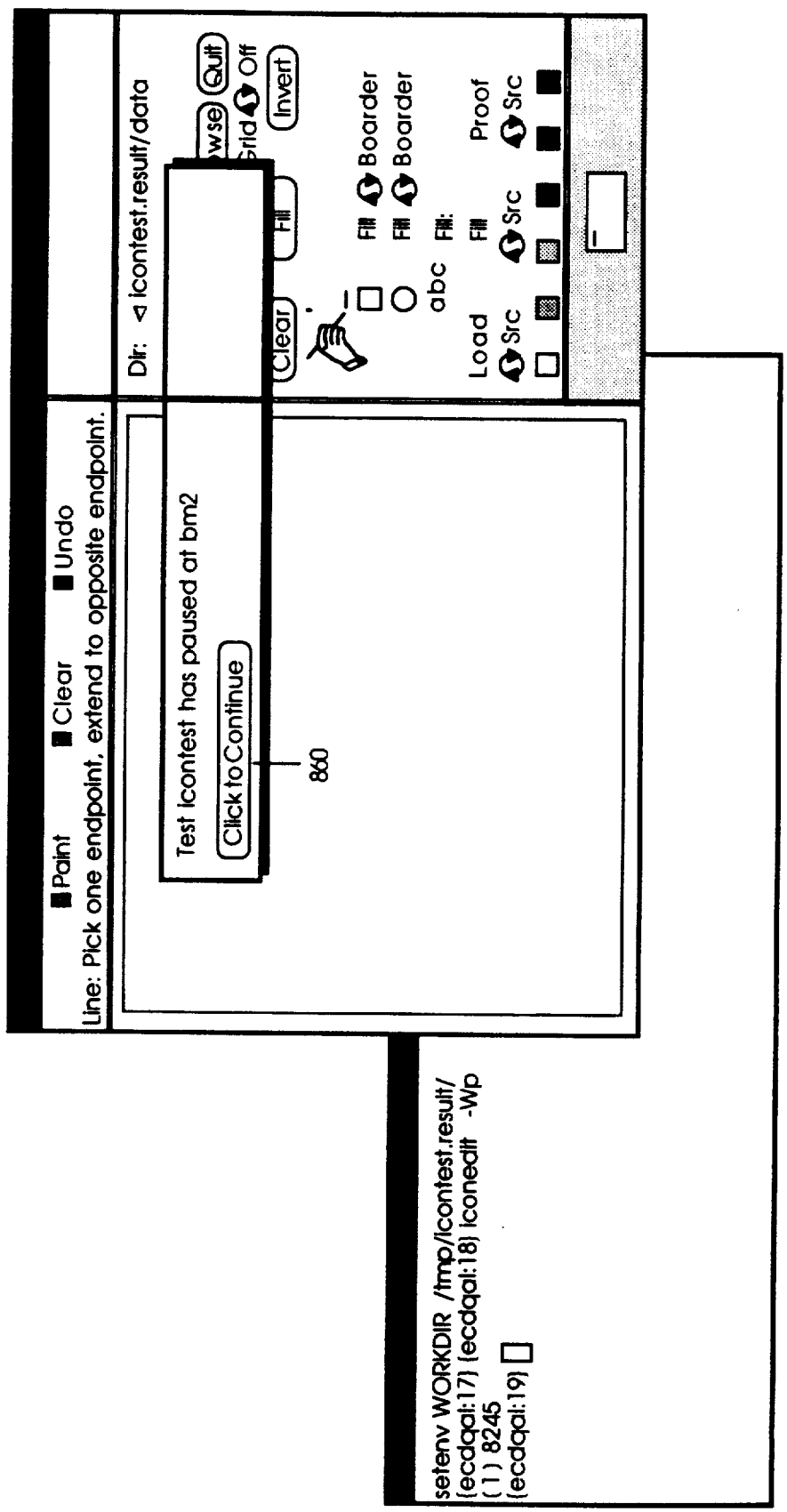

Referring back to FIG. 13b, after replay of the test, at block 750, the review option may be selected. The user has the option to compare pass/fail logs, small differences, select bitmasks, set and remove break points, rerun the application or review the differences, blocks 760, 770, 775, 780, and 800. The function, set and remove break points, is used to set break points during the execution of the journal file during replay. A break point is set prior to a comparison noted in the pass/fail log displayed by the review module. This is illustrated by FIG. 17a. FIG. 17a shows the review module menu in which a break point 850 has been set before the bit map comparison bm2. Thus when the test is replayed using the rerun module, the system will pause just before it performs the save data and comparison for bm2. FIG. 17b shows that during replay the replay execution is halted at the point where the break point has been set. In order to continue execution of the test, the user must move the cursor to the button 860 and click to continue. Breakpoints are typically used for debugging a test. When a failure occurs and the user is unable to determine the cause of failure, a breakpoint may be set and the test is rerun such that system will pause at the breakpoint and the user can evaluate the state of the test.

The rerun module, block 790, permits the user to rerun the test from the review module, and the review module, block 800, will trigger the review function execution means to display the differences between the master data and actual data for the comparison function selected from the pass/fail log displayed within the review module menu.

Using the information provided by review module, user may proceed to test the application, insert tolerances and filters in order to eliminate certain differences which may not be pertinent to the tests, modify the application to correct problems which were brought to the user's attention through this test. The test may then be re executed (rerun) on the modified application. Once testing is complete, the user simply exits the test system, block 810, by selecting the appropriate menu item which stops the system and closes the window of the test system.

Figure 16:
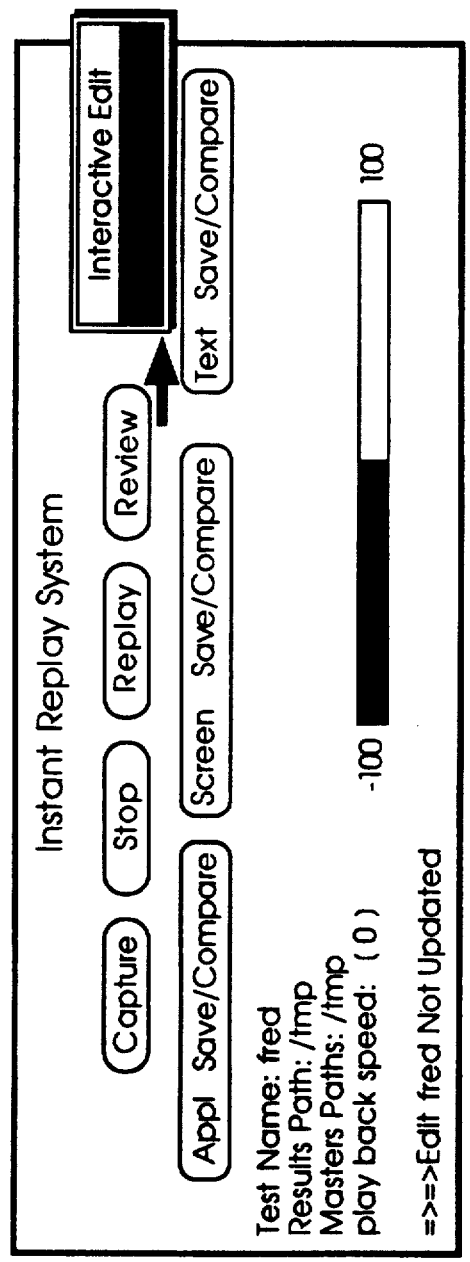
FIG. 16 illustrates the selection of the manual edit function.

Further flexibility is provided to the user of the testing system of the present invention. The user also has the capability to edit the journal file of user actions created during the capture portion of the test. The user can modify the journal file through an editing function whereby the user manually makes changes to the journal file or through an interactive edit function, (also referred to as edit/replay). To manually edit a journal file, the user simply selects the edit function from the test system menu. FIG. 16 illustrates the selection of the manual edit function "VI Session Script". Preferably, the journal file is stored in a low level binary format (An ASCII translation of a journal file is shown in FIG. 18a). Thus, to manually edit the journal file, the testing system translates the low level code to a higher level code in textual format which is understandable by the user, as illustrated in FIG. 18b. The user then may access the script and add/delete/change the line of code in the session script. Preferably, the script format is in the form:

```
SECS MSECS X-PIXEL Y-PIXEL
    FORWARD/ACTION
    FORWARD/OPERATOR.
```

When the user completes the manual edit of the script, the testing system translates the script to the low level code and generates an updated journal file. Similarly, the entire test may be created manually using this feature. However, it is preferred that the testing system include a Macro language to create journal files. Macro routines are preferably provided to simplify creation of the code which forms the test.

The Macro routines define the parameters of the user interface, such as the location of menu items. This illustrated by the program shown in FIG. 19a. This is preprocessed with a CPP and defines the window borders, pixel movements and function/button/text/menu selections by name. For example, the quit button is defined by the name "QUIT BUTTON" and is located at (x,y) coordinate location (990,426). Certain operations implemented during execution of the application are also included as Macro routines. For example, a macro routine defines the operation to start the application by the name "START ICONEDIT" and defines the actions to be performed. (For further information on the CPP language, see *CPP* (1), *SunOS Reference Manual*, Section 1: Commands, Sun Microsystems, Inc. Mountain View, Calif. (May 1988).

Using this information, the user can manually create a test. An example of a short test is shown in FIG. 19b. The definitions set forth in FIG. 19a are referenced and included into the program of 19b. For example, the application to be tested, "Iconedit" is initiated by the Macro "START-ICONEDIT" which is defined in the program shown in FIG. 19a.

By separately defining the parameters of the user interface, the same test can be executed among different interfaces by modifying the Marco definitions. The testing system interprets the code and translates it into the format of a journal file.

Figure 24:
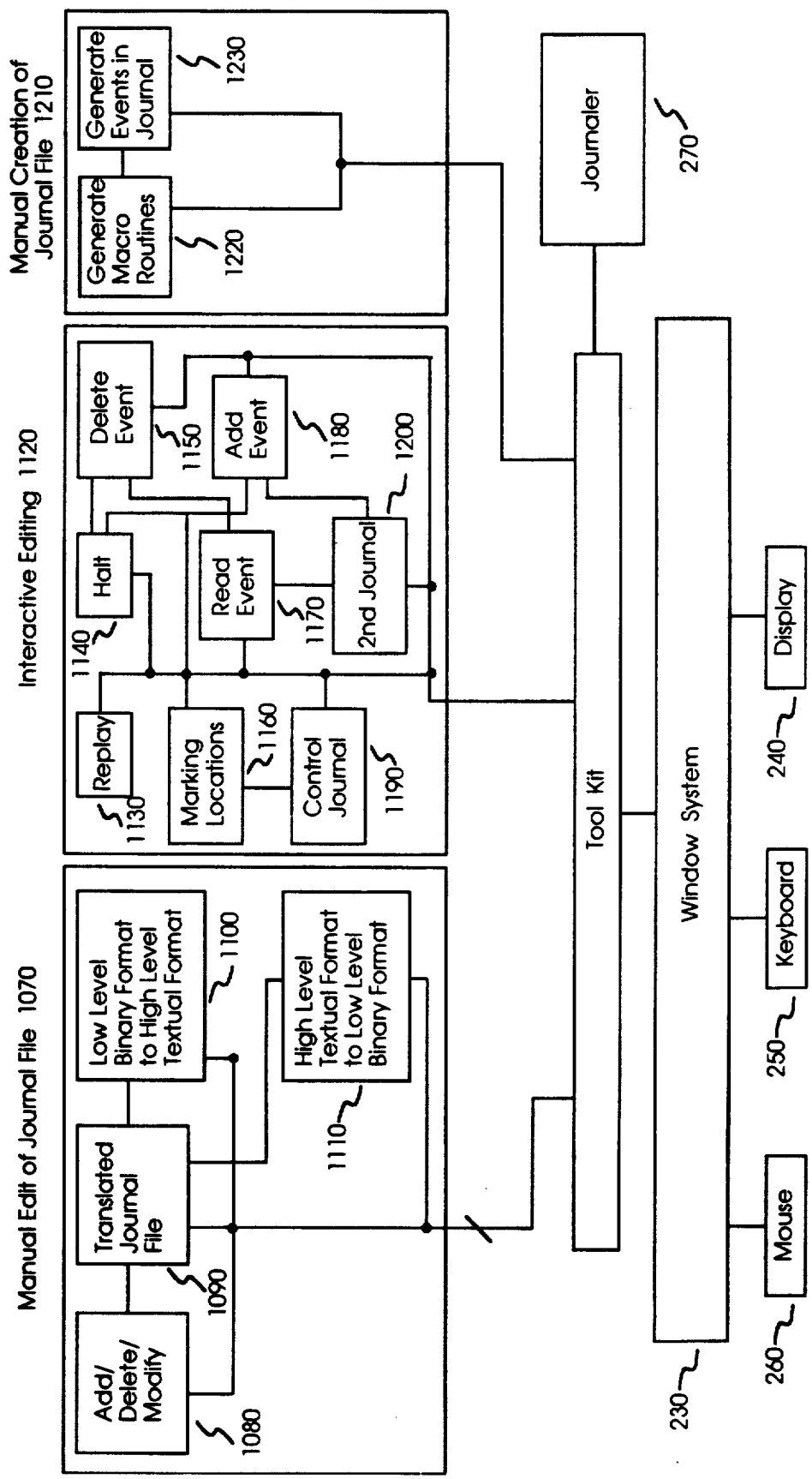
FIG. 24 illustrates the manual edit of the journal file means, interactive editing means and the manual creation of the journal file means of the present invention.

Now referring to FIG. 24, manual edit of journal file 1070 and manual creation of journal file 1210 are illustrated. Manual edit of journal file 1070 allows the user to edit the journal file in journaler 270. First, low level binary format to a high level textual format 1100 translation occurs on the events in the journal file to generate translated journal file 1090. Translated journal file 1090 may be viewed by the user to edit translated journal file 1090 by add/delete/modify means 1080. After the desired revision is made, translated journal file 1090 is translated by high level textual format to low level binary format 1110 so as to translate the user readable events back into the machine readable format. Manual creation of journal file means 1210 is also illustrated in FIG. 24. Generate macro routine means 1220 allows the user to define the parameters of the user interface for the window system. These macro routines may be appended to the journal file through generate events in journal file means 1230.

Figure 25:
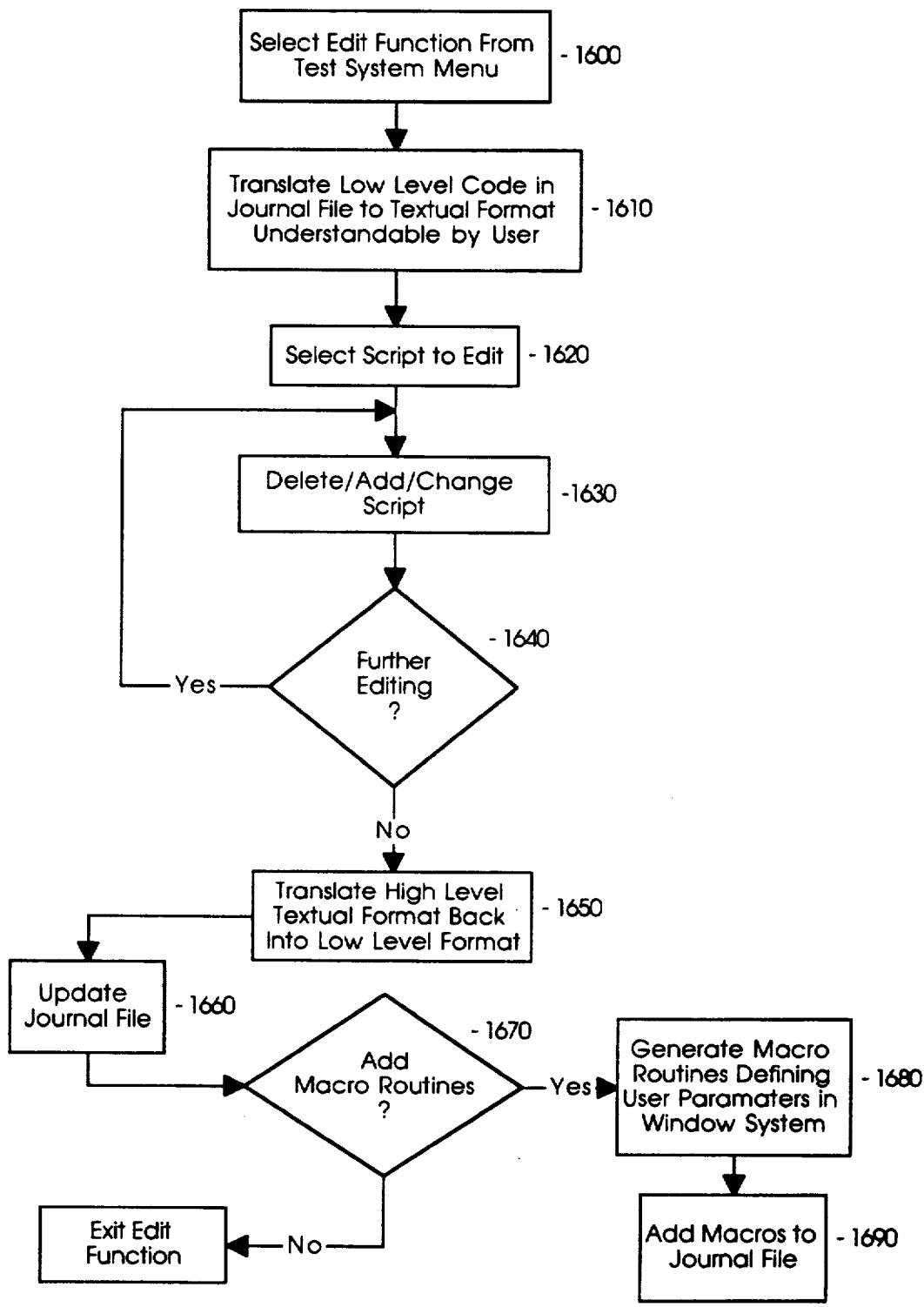
FIG. 25 is a flowchart illustrating the method for manually editing and creating the journal file.

The method for manually editing the journal file is illustrated in FIG. 25. In block 1600, the manual edit function is selected from the test system menu. The low level code of the journal file is translated to a textual format which is user readable as shown in block 1610. As shown in blocks 1620, 1630 and 1640, the user may delete, add or otherwise change an event by selecting the desired script. Then in block 1650, the high level script is transformed back into the binary form and the journal file is updated. As illustrated in blocks 1670, 1680 and 1690, macro routines may be added to the journal file.

If the user selects the interactive edit mode (See FIG. 16 "Interactive Edit"), the journal file is replayed as if another test is to be performed. However, the user may, at any time, halt the replay sequence using a predefined interrupt key, e.g. the "alt" key. Once halted, the user may add or delete a series of events at the location the replay sequence was halted. When the user breaks into the journal file during the interactive edit mode, a pop-up menu appears which asks the user if the user wishes to add or delete information in the journal file. For example, the user may wish to add a bit-map comparison to the session log to compare a portion of the screen at a point during execution not tested previously. This is done by selecting the add function and manually performing to user actions to perform a bit map save. Alternatively, a user may wish to remove events, for example, comparisons which are no longer needed in order to test a system. This is done by selecting the delete function. Upon selection of the delete function, the test system starts replay and deletes all events until another interrupt key is depressed.

The user may also insert what is called a mark. If a mark is placed in a journal file, and the interactive mode is subsequently selected, the mark will cause the replay mechanism to pause at the location of the mark in the journal file. This is useful to execute replacement of an event. During interactive edit, the event(s) to be removed are marked and deleted. When the journal file is replayed, the testing system stops execution of the journal file at the beginning of the deleted section where the mark was placed so that the insert may be performed.

During the interactive edit mode, the events in the journal file are read, executed, and written to a second file which becomes the updated version of the journal file. Thus, the delete function is implemented by not writing the event data to the second file. Similarly, the insert function is enabled by writing the additional events to the second file while pausing the replay of the original journal file.

Referring again to FIG. 24, interactive editing means 1120 comprises of control journal 1190 which permits the user to control the stop and start of the journal file. Replay means 1130 will permit the events in the journal file to be replayed. The journal file may be paused by halt means 1140 and, while the journal filed is halted, events may be added by add event means 1180, or deleted by delete event means 1150. Marking location means 1160 allows the user to mark locations in the journal file such that when the journal file is replayed, a pause will occur at the location of the mark. As the events are read by read event means 1170, the user may add events through add event means 1180 to 2nd journal file 1200, as well as delete events through delete means 1150 which causes events read not to be written to 2nd journal file 1200.

Figure 26:
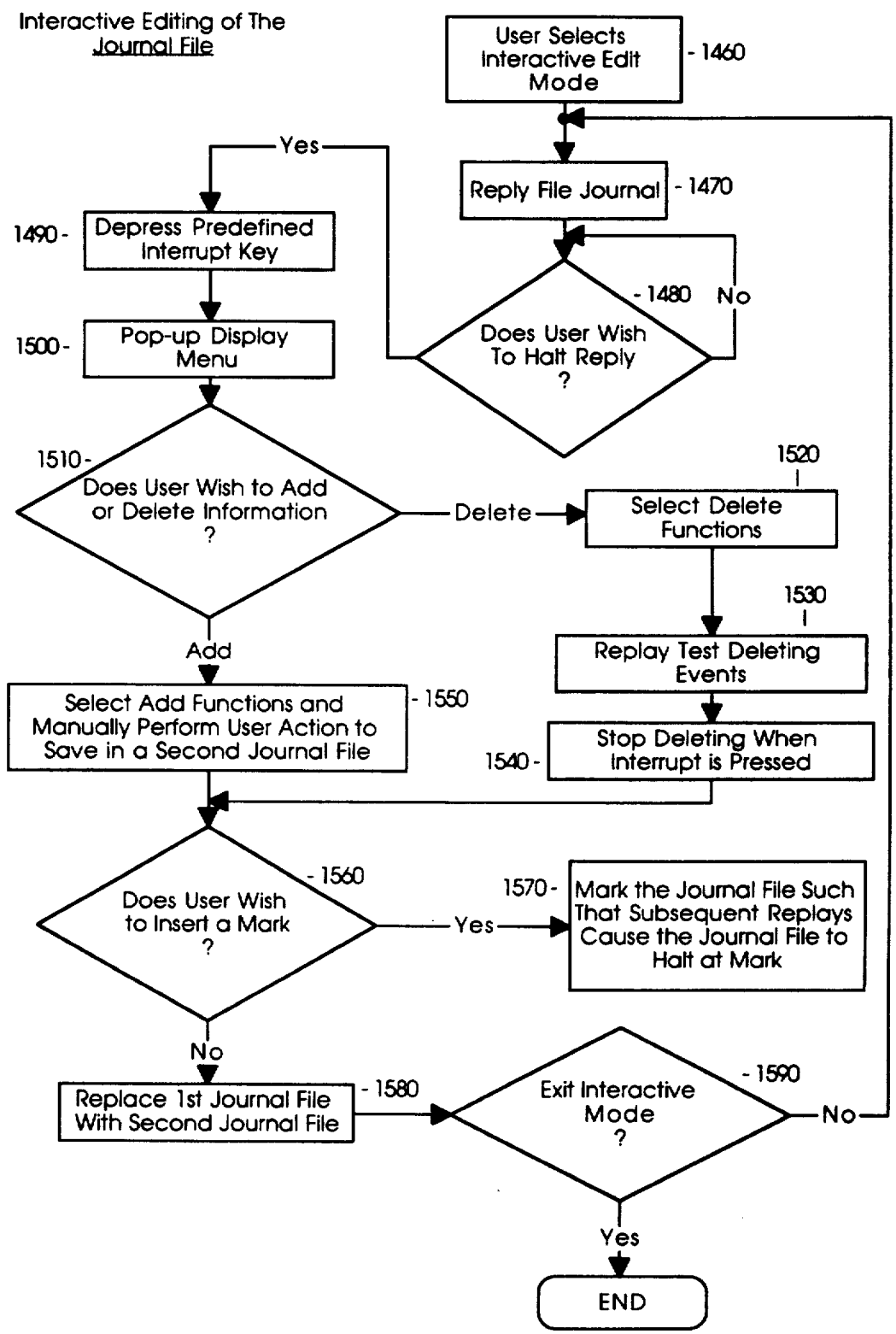
FIG. 26 is a flowchart illustrating the method for interactively editing the journal file.

The method for interactive editing is illustrated in FIG. 26. After the user selects the interactive edit mode, in block 1460, the journal file will be replayed. At any time, the user may halt the replay as shown in block 1480 and 1490 by depressing a pre-determined interrupt key. At this point a pop-up menu will appear and the user may add an event as shown in block 1550 or delete an event, as shown in blocks 1520, 1530 and 1540, at the location the journal was halted. In block 1560 and 1570, the user may select to insert a mark whereas the mark will cause subsequent replays of the journal file to halt at the marked location. In block 1580, the user may replace the original journal file with the second journal file.

While the invention has been described in conjunction with the preferred embodiment, it is evident that numerous alternatives, modifications, variations and uses will be apparent to those skilled in the art in light of the foregoing description.

We claim:

1. In a window-based computer system comprising a central processing unit (CPU), memory, input/output devices comprising a keyboard, mouse and display, wherein the input and output of information is performed through windows defined on the display, a user extensible, automated testing system generating test results for the testing of application programs which compares master data to actual data generated during the testing of the application program, said test results comprising the differences between the master data and actual data, said user extensible, automated testing system comprising:

journaling means coupled to said window system for generating and replaying a journal file comprising a list of events representative of user actions performed during a user session which, when replayed, cause the application program to be executed in a predetermined manner which tests the application program;

filter means for eliminating portions of data which are not determinative of the test results, said filter means accepting data generated from the testing of the application programs, said filter means comprising;

filter functions which, when executed, filter portions of data, each filter function identified by name;

a filter list file, comprising a list of names of at least one filter function to filter portions of data, said filter list file referenced to determine available filter functions;

filter execution means coupled to the filter list file and the central processing unit such that the filter functions are executed by the central processing unit to filter portions of data according to the filter functions listed in the filter list file; and filter modification means coupled to the filter list file, filter functions and to the input/output devices through the window system, the filter modification means modifying the filter list file such that filter functions can be added, deleted or changed;

save data means to save data generated during the testing of the application program, said save data means being coupled to the window system and to the filter means such that data output from said filter means is input to said save data means, said save data means comprising;

save data functions, which, when executed, save predetermined portions of the data, each save data function identified by a name;

save data execution means coupled to said save data functions and the central processing unit such that said save data functions are executed by the central processing unit to save predetermined portions of the data according to specified save data functions, said save data execution means enabled by a plurality of events placed in the journal file representative of user actions which selects the save data function; and save data modification means coupled to the save data functions and to the input/output devices through the window system so as to modify the save data functions such that save data functions can be added, deleted or changed;

comparison means for comparing predetermined portions of data from the master data to corresponding portions of data from the actual data, said comparison means being coupled to the save data means such that portions of data saved by the save data functions are input to the comparison means, said comparison means comprising;

comparison functions, each identified by name, which, when executed, compare predetermined portions of the master data with corresponding predetermined portions of the actual data, determine the differences between the predetermined portions of the master data and actual data, and cause a failure file to be generated containing the actual data saved which have differences as determined by the comparison function;

comparison execution means coupled to the comparison functions and the central processing unit so as to compare predetermined portions of the master data and actual data according to the comparison functions, said comparison execution means enabled after execution of save data is completed;

comparison modification means to modify the comparison functions, said comparison modification means coupling the comparison functions to the input/output devices through the window system such that comparison functions can be added, deleted or changed;

wherein the testing system is extensible by modification of the filter functions, save data functions, comparison functions.

2. The user extensible, automated testing system as described in claim 1, wherein the filter modification means further comprises means to create, delete and modify filter functions.

3. The user extensible, automated testing system as described in claim 1, wherein the filter functions, save data functions and comparison functions are selectable by the mouse through menus displayed within windows on the display.

4. The user extensible, automated testing system as described in claim 1, wherein the journaling means generates a journal file by capturing the events representative of user actions and writing the events into the journal file.

5. The user extensible, automated testing system as described in claim 4, wherein the filter functions, save data functions and comparison functions are selectable by the mouse through menus displayed within windows on the display and said journal file comprises the mouse events representative of the user actions to select functions whereby during replay of the journal file the functions will be selected by replay of the events by the journaling means.

6. The user extensible, automated testing system as described in claim 1, wherein said filter means comprises a filter function to eliminate predetermined portions of data.

7. The user extensible, automated testing system as described in claim 1, wherein said filter means comprises a filter function to translate predetermined portions of data from a first format to a second format.

8. The user extensible, automated testing system as described in claim 1, wherein said filter means comprises a plurality of filter functions which are pipelined together to filter data.

9. The user extensible, automated testing system as described in claim 1, wherein said filter modification means comprises a text editor.

10. The user extensible, automated testing system as described in claim 1, wherein said filter execution means is enabled when a save data function is enabled.

11. The user extensible, automated testing system as described in claim 1, wherein said save data functions save text data.

12. The user extensible, automated testing system as described in claim 1, wherein said save data functions save bit map image data.

13. The user extensible, automated testing system as described in claim 1, wherein said save data functions save user-defined data in binary data format.

14. The user extensible, automated testing system as described in claim 1, wherein said save data modification means comprises a text editor.

15. The user extensible, automated testing system as described in claim 1, wherein said comparison means compares two text files.

16. The user extensible, automated testing system as described in claim 1, wherein said comparison means compares two bit map images.

17. The user extensible, automated testing system as described in claim 1, wherein said filter modification means comprises a text editor.

18. The user extensible, automated testing system as described in claim 1, wherein a failure file is generated by storing the save data in the failure file and removing the save data from the failure file if no differences are determined.

19. The user extensible, automated testing system as described in claim 1, wherein said filter execution means is automatically enabled during execution of a save data function.

20. The user extensible, automated testing system as described in claim 1, wherein said comparison means comprises a text editor.

21. The user extensible automated testing system as described in claim 20, the review module further comprises as means to mask specified data coupled to the window system, the master data and the actual data such that the master data and actual data are masked such that the masked data in the actual data is not compared to corresponding master data.

22. The user extensible automated testing system as described in claim 21, wherein the information identifying masks is stored with the corresponding master data.

23. The user extensible automated testing system as described in claim 21 wherein the means to mask specified data highlights the portions of the displayed data which have been masked.

24. The user extensible, automated testing system as described in claim 1, further comprising a review module coupled to the comparison means and the input/output devices through the window system to review the differences between the master data and save data comprising;
   means to graphically display within a window on the display, the differences between the master data and save data;
   whereby the differences between the master data and the save data can be graphically reviewed.

25. The user extensible automated testing system as described in claim 24, wherein the comparison means compares bit map images and the review module further comprises:
   means to display the actual data as a bit mapped image; and
   means to display the differences between the master data and actual data by highlighting the differences in the bit map image display of actual data.

26. The user extensible automated testing system as described in claim 25, wherein the differences are highlighted by turning on and off the pixels of the display which are part of differences.

27. The user extensible automated testing system as described in claim 24, wherein the comparison means compares bit map images and the review module further comprises:
   means to display the differences between the master data and actual data by displaying only those portions of the image which contain differences.

28. The user extensible automated testing system as described in claim 24, wherein the comparison means compares text data and the review module further comprises:
   means to display the actual data as lines of text on a first portion of the screen;
   means to display the master data as lines of text on a second portion of the screen; and
   means to display the differences between the master data and actual data by displaying on a second portion of the display a flag at each line where differences are noted.

29. The user extensible automated testing system as described in claim 24, wherein the comparison means compares text data and the review module further comprises:
   means to display the actual data as lines of text; and
   means to display the differences between the master data and actual data by highlighting the differences in the text display of actual data.

30. The user extensible automated testing system as described in claim 24, wherein the review module further comprises a means to set tolerances on subsequent comparisons such that if the test is replayed and differences are within tolerances set, the comparison will determine a small difference.

31. The user extensible automated testing system as described in claim 30, wherein the tolerances comprise bit shifts of a predetermined number of pixels such that if the pixels are shifted within the predetermined number of pixels, a small difference will be determined.

32. The user extensible automated testing system as described in claim 30, wherein the tolerances comprise color differences of a predetermined numeric value such that if the color of pixels are shifted within the predetemined numeric value, a small difference will be determined.

33. The user extensible automated testing system as described in claim 32, wherein the data is a bit map image and the masked data is identified by designating boundaries of portions of a bit map image displayed on the display.

34. The user extensible automated testing system as described in claim 24, wherein the review module further comprises a means to update the master data being coupled to the actual data and master data, and to the input/output devices through the window system so as to replace the master data with the actual data.

35. The user extensible automated testing system as described in claim 24, wherein said review module further comprises a means to generate and display a log of each comparison performed and whether the comparison passed with no differences determined or failed because of differences determined.

36. The user extensible automated testing system as described in claim 35, wherein said review module further comprises a display selection means which enables the user to select a comparison from the log of comparisons performed, said means controlling the means to graphically display within a window on the display, to generate and display the differences between the master data and save data;

whereby the differences between the master data and the save data can be graphically reviewed.

37. The user extensible atuomated testing system as described in claim 24, wherein said review module further comprises a means to set breakpoints in the journal file coupled to said journal file through the window system, said breakpoints causing the journaling means to pause replay of the events recorded in the journal file.

38. The user extensible automated testing system as described in claim 1, further comprising a means to link a predetermined save data function and comparison function coupled to the save data means and the comparison means so as to create a list of save data/comparison function pairs, each save data/comparison pair being identified by name, wherein the save data functions and comparison functions are selected through selection of a named save data/comparison pair.

39. The user extensible automated testing system as described in claim 38, wherein the save data functions and comparison functions are selectable through selection of a save data/comparison pair selectable through a menu displayed within a window on the display.

40. The user extensible automated testing system as described in claim 24, further comprising a means to link a predetermined save data function, comparison function and review function coupled to the save data means, comparison means and review means so as to create a list of save data/comparison/review function triples, each save data/comparison/review triple being identified by name, wherein the save data functions, comparison functions and review functions are selected through selection of a named save data/comparison/review triple.

41. The user extensible automated testing system as described in claim 40, wherein the save data functions, comparison functions and review functions are selectable through selection of a save data/comparison/review triple selectable through a menu displayed within a window on the display.

42. The user extensible automated testing system as described in claim 1 further comprising a means to manually edit the journal file coupled to the window system, said means comprising:

means to translate the events in a first format stored in the journal file into a second format translated journal file understandable by the user;

means to add, delete or modify the translated events being coupled to the translated journal file; and means to translate the translated journal file events from the second format back to the first format, said means being coupled to the translated journal file and the window system;

whereby the user session can be modified to add, delete or change the user actions performed during the user session.

43. The user extensible automated testing system as described in claim 42, further comprising a means to manually create a journal file coupled to the journal file and input/output devices through the window system, said means comprising:

means to generate macro routines which defines the parameters of the user interface of the window system the test systems operates within; and means to include selected macro routines in the journal file to generate events in the journal file representative of user actions.

44. The user extensible automated testing system as described in claim 1, further comprising an interactive editing means coupled to the journal file and the input/output devices through the window system, said means comprising:

means to control the journaling means to replay the journal file;

means to halt replay of the journal file;

means to delete the event in the journal file coupled to said halt replay so as to delete the event at which replay was halted; and means to add events in the journal file coupled to said halt replay so as to add the event at the location at which replay was halted;

whereby a journal file is interactively edited during replay of the journal file.

45. The user extensible automated testing system as described in claim 44, wherein said interactive editing means further comprises:

means for marking locations in the journal file; and means to control the journaling means whereby subsequent replay of the journal file will cause the journaling means to pause replay at the location of the mark;

whereby the means to add events and means to delete events are used to add and delete events at the location of the mark.

46. The user extensible automated testing system as described in claim 44, wherein said interactive editing means reads each event replayed and writes the event to a second journal file, said second journal file being coupled to the means to add events, the means to delete events and the journal file, said means to add events adds events to the second journal file, said means to delete events causes the events to not be written to the second journal file, said second journal file replacing the existing journal file at completion of the interactive edit.

47. In a window-based computer system comprising a central processing unit (CPU), memory, input/output devices comprising a keyboard, mouse and display, wherein the input and output of information is performed through windows defined on the display, a user extensible, automated testing process generating test results for the testing of application programs which compares master data to actual data generated during the testing of the application program, said test results comprising the differences between the master data and actual data, said user extensible, automated process for testing the application program comprising the steps of:

generating events representative of user actions performed during a user session, said events comprising events to execute the application program;

generating events to perform comparisons between the master data and actual data comprising the steps of;

filtering portions of data which are not determinative of the test results by executing filter functions which filter portions of data, each filter function identified by name and identified in a filter list file, said filter list file comprising a list of names of filter functions available to filter portions of data and is modified to add, delete or change filter functions;

saving data generated during the testing of the application program according to save data functions which save predetermined portions of the data, each save data function identified by a name and enabled by a plurality of events placed in the journal file representative of user actions which selects the save data function, said save data functions are modified to add, delete or change save data functions;

comparing predetermined portions of data from the master data to corresponding portions of data from the actual data, according to comparison functions each identified by name, to determine differences between predetermined portions of the master data and actual data, said comparison functions are modified to add, delete or change comparison functions; and generating a failure file containing the actual data saved if differences are determined;

generating a journal file by recording events representative of user actions performed during a user session, said user actions comprising actions to execute the application program and actions to perform comparisons between master data and actual data; and replaying the journal file which causes the events recorded to be executed to test the application program by executing the application program and performing comparisons between the master data and actual data.

48. The process as described in claim 47, further comprising the steps of selecting the filter functions, save data functions and comparison functions by selecting the corresponding menu items on the menus displayed within windows on the display.

49. The process as described in claim 47, wherein the step of generating a journal file comprises capturing the events representative of user actions and writing the events into the journal file.

50. The process as described in claim 47, wherein the step of filtering comprises eliminating predetermined portions of data.

51. The process as described in claim 47, wherein the step of filtering comprises translating predetermined portions of data from a first format to a second format.

52. The process as described in claim 47, wherein the data is text data.

53. The process as described in claim 47, wherein the data is bit map image data.

54. The process as described in claim 47, wherein the data is user-defined data in binary data format.

55. The process as described in claim 47, the step of generating a failure file comprises the steps of storing the save data in the failure file and removing the save data from the failure file if no differences are determined.

56. The process as described in claim 47, further comprising the step of reviewing the differences between the master data and save data by graphically displaying within a window on the display the differences between the master data and save data.

57. The process as described in claim 56, wherein the data are bit map images and the step of reviewing comprises:
displaying the actual data as a bit map image; and
displaying the differences between the master data and actual data by highlighting the differences in the bit map image display of actual data.

58. The process as described in claim 57, wherein the differences are highlighted by turning on and off the pixels of the display which are part of differences.

59. The process as described in claim 56, wherein the data are bit map images and the step of reviewing comprises:
displaying the differences between the master data and actual data by displaying only those portions of the image which contain differences.

60. The process as described in claim 56, wherein the data is text data and the step of reviewing comprises:
displaying the actual data as lines of text on a first portion of the screen;
displaying the master data as lines of text on a second portion of the screen; and
displaying the differences between the master data and actual data by displaying on a second portion of the display a flag at each line where differences are noted.

61. The process as described in claim 56, wherein the data is text data and the step of reviewing comprises:
displaying the actual data as lines of text; and
displaying the differences between the master data and actual data by highlighting the differences in the text display of actual data.

62. The process as described in claim 56, wherein the step of reviewing further comprises the step of setting tolerances on subsequent comparisons such that if the test is replayed and differences are are within tolerances set, the comparison will determine a small difference.

63. The process as described in claim 62, wherein the tolerances comprise bit shifts of a predetermined number of pixels such that if the pixels are shifted within the predetermined number of pixels, a small difference will be determined.

64. The process as described in claim 62, wherein the tolerances comprise color differences of a predetermined numeric value such that if the color of pixels are shifted within the predetermined numeric value, a small difference will be determined.

65. The process as described in claim 56, wherein the step of reviewing further comprises the step of masking specified data in the master data and actual data such that the masked data in the actual data is not compared to corresponding master data.

66. The process as described in claim 65, wherein the data is a bit map image and the marked data is identified by designating boundaries of portions of a bit map image displayed on the display.

67. The process as described in claim 65, wherein the information identifying masks is stored with the corresponding master data.

68. The process as described in claim 56, wherein the step of reviewing further comprises the step of updating the master data by replacing the master data with the actual data.

69. The process as described in claim 56, further comprising the step of generating and displaying a log of each comparison performed and whether the comparison passed with no differences determined or failed because of differences determined.

70. The process as described in claim 69, wherein the step of reviewing further comprises the step of selecting a comparison from the log of comparisons performed to generate and display the differences between the master data and save data;
whereby the differences between the master data and the save data can be graphically reviewed.

71. The process as described in claim 56, wherein the step of reviewing further comprises the step of setting breakpoints in the journal file, said breakpoints causing the journaling means to pause replay of the events recorded in the journal file 72. The process as described in claim 47, further comprising the step of linking a predetermined save data function and comparison function by creating a list of save data/comparison function pairs, each save data/comparison pair being identified by name, wherein the save data functions and comparison functions are selected through selection of a named save data/comparison pair.

73. The process as described in claim 56, further comprising the step of linking a predetermined save data function comparison function and review function by creating a list of save data/comparison/review function triples, each save data/comparison/review triple being identified by name, wherein the save data functions, comparison functions and review functions are selected through selection of a named save data/comparison/review triple.

74. The process as described in claim 47, further comprising the step of manually editing the journal file, said step comprising:

translating the events in a first format stored in the journal file into a second format understandable by the user;
adding, deleting or modifying the translated events; and
translating the translated events from the second format back to the first format;
whereby the user session can be modified to add, delete or change the user actions performed during the user session.

75. The process as described in claim 47, further comprising the step of manually creating a journal file comprising:
generating macro routines which define the parameters of the user interface of the window system the test systems operates within; and
including selected macro routines in the journal file to generate events in the journal file representative of user actions.

76. The process as described in claim 47, further comprising the step of interactively editing the journal file, said step comprising:
controlling the journaling means to replay the journal file;
halting replay of the journal file;
deleting the event in the journal file at which replay was halted; and
adding events in the journal file at the location at which replay was halted;
whereby a journal file is interactively edited during replay of the journal file.

77. The process as described in claim 76, wherein the step of interactively editing the journal file comprises:
marking locations in the journal file; an
controlling the journaling means whereby subsequent replay of the journal file will cause the journaling means to pause replay at the location of the mark;
whereby events are added and deleted at the location of the mark.

78. The process as described in claim 77, wherein the step of interactively editing comprises reading each event replayed and writing the event to a second journal file which subsequently replaces the first journal file, whereby events are added to the second journal file and events are removed from the journal, said means to add events adds events to the second journal file and delete events by not writing to the second journal file.

* * * * *